US012705710B2

(12) United States Patent
Imber et al.

(10) Patent No.: US 12,705,710 B2
(45) **Date of Patent: *Aug. 11, 2026**

(54) UPSAMPLING BLOCKS OF PIXELS

(71) Applicant: Imagination Technologies Limited, Kings Langley (GB)

(72) Inventors: James Imber, Hertfordshire (GB); Joseph Heyward, Hertfordshire (GB); Kristof Beets, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 245 days.

This patent is subject to a terminal disclaimer.

(21) Appl. No.: 18/373,855

(22) Filed: Sep. 27, 2023

(65) Prior Publication Data

US 2024/0135507 A1 Apr. 25, 2024

(30) Foreign Application Priority Data

Sep. 30, 2022 (GB) ...................................... 2214433
Sep. 30, 2022 (GB) ...................................... 2214435
Sep. 30, 2022 (GB) ...................................... 2214437

(51) Int. Cl.
*G06T 3/4053* (2024.01)
*G06T 5/73* (2024.01)
*G06T 5/94* (2024.01)

(52) U.S. Cl.
CPC .............. *G06T 5/73* (2024.01); *G06T 3/4053* (2013.01); *G06T 5/94* (2024.01); *G06T 2207/20021* (2013.01)

(58) Field of Classification Search
CPC ........... G06T 5/73; G06T 3/4053; G06T 5/94; G06T 2207/20021
See application file for complete search history.

(56) References Cited

U.S. PATENT DOCUMENTS 5,038,388 A 8/1991 Song
5,327,257 A * 7/1994 Hrytzak ................ G06F 17/175 358/448

(Continued)

FOREIGN PATENT DOCUMENTS

CN 103236035 A 8/2013
EP 0398861 A2 11/1990

(Continued)

OTHER PUBLICATIONS

Zhou et al; "Image zooming using direction cubic convolution interpolation"; IET Image Process; vol. 6; No. 6; (Year: 2012).*

(Continued)

*Primary Examiner* — Amandeep Saini
*Assistant Examiner* — Jaspreet Kaur
(74) *Attorney, Agent, or Firm* — Potomac Law Group, PLLC; Vincent M DeLuca

(57) ABSTRACT

Methods and processing modules upsample a block of input pixels to determine a block of upsampled pixels. At least one of the upsampled pixels is a diagonal pixel, wherein a diagonal pixel is at a position that is not in any of the rows nor in any of the columns of input pixels in the block of input pixels. Indications of image gradients are determined for the block of input pixels. The determined indications of image gradients are used to determine one or more weighting parameters which are indicative of weights of a diagonal kernel. The upsampled pixels of the block of upsampled pixels are determined by applying kernels to the block of input pixels, wherein the diagonal pixel in the block of upsampled pixels is determined by applying the diagonal kernel to the block of input pixels in accordance with the determined one or more weighting parameters.

20 Claims, 11 Drawing Sheets

(56) References Cited

U.S. PATENT DOCUMENTS

| | | | |
|---|---|---|---|
| 7,386,185 | B2 | 6/2008 | Watanabe et al. |
| 8,538,203 | B2 | 9/2013 | Pan |
| 2004/0001234 | A1 | 1/2004 | Curry et al. |
| 2005/0104974 | A1 | 5/2005 | Watanabe et al. |
| 2009/0324136 | A1 | 12/2009 | Yamada et al. |
| 2012/0082396 | A1 | 4/2012 | Crandall et al. |
| 2013/0177242 | A1 | 7/2013 | Adams, Jr. et al. |

FOREIGN PATENT DOCUMENTS

| | | | |
|---|---|---|---|
| EP | 0449259 | A2 | 10/1991 |
| TW | 201209755 | A | 3/2012 |
| WO | 9007751 | A1 | 7/1990 |
| WO | 93/17394 | A1 | 9/1993 |
| WO | 2015180527 | A1 | 12/2015 |

OTHER PUBLICATIONS

Iwamoto et al; Gradient-Based Edge Preserving Interpolation an its Application to Super-Resolution; vol. 96; No. 1 (Year: 2013).*

T. Sahoo and S. Pine, "Design and simulation of various edge detection techniques using Matlab Simulink," 2016 International Conference on Signal Processing, Communication, Power and Embedded System (SCOPES), Paralakhemundi, India, 2016, pp. 1224-1228, doi: 10.1109/SCOPES.2016.7955636. (Year: 2016).*

Ming Gao, Shiyin Qin, High performance super-resolution reconstruction of multi-frame degraded images with local weighted anisotropy and successive regularization, Optik, vol. 126, Issue 23,2015, pp. 4219-4227, ISSN 0030-4026, https://doi.org/10.1016/j.ijleo.2015.08.119. (Year: 2015).*

Cox; photographylife.com; "When and How to Upsample an Image"; https://photographylife.com/how-to-upsample-image; last updated 2021; 1 page.

dpreview.com "Sharpen before or after image resizing"; https://www.dpreview.com/forums/thread/65583; Mar. 2001; 1 page.

Gao et al; "An X-ray Image Enhancement Algorithm for Dangerous Goods in Airport Security Inspection"; 2021 Asia-Pacific Conference on Communications Technology and Computer Science (ACCTCS); Jan. 22, 2021; pp. 43-46.

Iwamoto et al; "Gradient-Based Edge Preserving Interpolation an its Application to Super-Resolution"; vol. 96; No. 1; pp. 43-50.

Salgian et al; "Using Direction Variance to Extract Curves in Images, Thus Improving Object Recognition in Clutter"; Retrieved from the Internet: URL:https://www.researchgate.net/publication/2295810_Using_Directional_Variance_to_Extract_Curves_in_Images_Thus_Improving_Object_Recognition_in_Clutter.

Zhou et al; "Image zooming using direction cubic convolution interpolation"; IET Image Process; vol. 6; No. 6; Aug. 24, 2012; pp. 627-634.

Ye et al, "Blurriness-Guided Unsharp Masking", IEEE Transactions on Image Processing , vol. 27, No. 9, pp. 17, 19-22, 4465-4477, 2018.

Polesel et al, "Image Enhancement via Adaptive Unsharp Masking", IEEE Transactions on Image Processing, vol. 9, No. 3, pp. 505-510, 2000.

"Unsharp Mask", Image Effects Image Effects Component, 2021, web.archive.org/web/20211009031040/https://www.websupergoo.com/helpie/default.htm?page=source%2F2-effects%2Funsharpmask.htm. (2021) (Year: 2021).

Sharda, Aryaman: "Understanding Image Contrast Algorithms—Aryaman Sharda—Medium", Medium, Jan. 12, 2021, aryamansharda.medium .com/understanding-i mage-contrast-algorithms-8636723a0f05. (2021) (Year: 2021).

* cited by examiner

UPSAMPLING BLOCKS OF PIXELS

CROSS-REFERENCE TO RELATED APPLICATIONS AND CLAIM OF PRIORITY

This application claims foreign priority under 35 U.S.C. 119 from United Kingdom patent application Nos. 2214437.2, 2214435.6, and 2214433.1, all of which were filed on 30 Sep. 2022, and which are herein incorporated by reference in their entirety.

FIELD

The present disclosure is directed to upsampling blocks of pixels, e.g. for super resolution techniques.

BACKGROUND

The term 'super resolution' refers to techniques of upsampling an image that enhance the apparent visual quality of the image, e.g. by estimating the appearance of a higher resolution version of the image. When implementing super resolution, a system will attempt to find a higher resolution version of a lower resolution input image that is maximally plausible and consistent with the lower-resolution input image. Super resolution is a challenging problem because, for every patch in a lower-resolution input image, there is a very large number of potential higher-resolution patches that could correspond to it. In other words, super resolution techniques are trying to solve an ill-posed problem, since although solutions exist, they are not unique.

Super resolution has important applications. It can be used to increase the resolution of an image, thereby increasing the 'quality' of the image as perceived by a viewer. Furthermore, it can be used as a post-processing step in an image generation process, thereby allowing images to be generated at lower resolution (which is often simpler and faster) whilst still resulting in a high quality, high resolution image. An image generation process may be an image capturing process, e.g. using a camera. Alternatively, an image generation process may be an image rendering process in which a computer, e.g. a graphics processing unit (GPU), renders an image of a virtual scene. Compared to using a GPU to render a high resolution image directly, allowing a GPU to render a low resolution image and then applying a super resolution technique to upsample the rendered image to produce a high resolution image has potential to significantly reduce the latency, bandwidth, power consumption, silicon area and/or compute costs of the GPU. GPUs may implement any suitable rendering technique, such as rasterization or ray tracing. For example, a GPU can render a 960×540 image (i.e. an image with 518,400 pixels arranged into 960 columns and 540 rows) which can then be upsampled by a factor of 2 in both horizontal and vertical dimensions (which is referred to as '2× upsampling') to produce a 1920×1080 image (i.e. an image with 2,073,600 pixels arranged into 1920 columns and 1080 rows). In this way, in order to produce the 1920×1080 image, the GPU renders an image with a quarter of the number of pixels. This results in very significant savings (e.g. in terms of latency, power consumption and/or silicon area of the GPU) during rendering and can for example allow a relatively low-performance GPU to render high-quality, high-resolution images within a low power and area budget, provided a suitably efficient and high-quality super-resolution implementation is used to perform the upsampling.

FIG. 1 illustrates an upsampling process. An input image 102, which has a relatively low resolution, is processed by a processing module 104 to produce an output image 106 which has a relatively high resolution. Each of the black dots in the input image 102 and in the output image 106 represents a pixel. In the example shown in FIG. 1, the processing module 104 applies 2× upsampling such that the output image 106 has twice as many rows of pixels and twice as many columns of pixels as the input image 102. In other examples, different upsampling factors (other than 2×) may be applied.

In some systems, the processing module 104 may implement a neural network to upsample the input image 102 to produce the upsampled output image 106. Implementing a neural network may produce good quality output images, but often requires a high performance computing system (e.g. with large, powerful processing units and memories) to implement the neural network. Furthermore, the neural network needs to be trained, and depending on the training the neural network may only be suitable for processing some input images. As such, implementing a neural network for performing upsampling of images may be unsuitable for reasons of processing time, latency, bandwidth, power consumption, memory usage, silicon area and compute costs. These considerations of efficiency are particularly important in some devices, e.g. small, battery operated devices with limited compute and bandwidth resources, such as mobile phones and tablets.

Some systems therefore do not use a neural network for performing super resolution on images, and instead use more conventional processing modules. For example, some systems split the problem into two stages: (i) upsampling and (ii) adaptive sharpening. The upsampling stage can be performed cheaply, e.g. using bilinear upsampling, and the adaptive sharpening stage can be used to sharpen the image, i.e. reduce the blurring introduced by the upsampling. FIG. 2 is a flow chart for a process of performing super resolution by performing upsampling and adaptive sharpening in two stages of processing.

In step S202 the input image is received at the processing module 104. FIG. 1 shows a simplified example in which the input image has 36 pixels arranged in a 6×6 block of input pixels, but in a more realistic example the input image may be a 960×540 image. The input image could be another shape and/or size.

In step S204 the processing module 104 upsamples the input image using, for example, a bilinear upsampling process. Bilinear upsampling is known in the art and uses linear interpolation of adjacent input pixels in two dimensions to produce output pixels at positions between input pixels. For example, when implementing 2× upsampling: (i) to produce an output pixel that is halfway between two input pixels in the same row, the average of those two input pixels is determined; (ii) to produce an output pixel that is halfway between two input pixels in the same column, the average of those two input pixels is determined; and (iii) to produce an output pixel that is not in the same row or column as any of the input pixels, the average of the four nearest input pixels is determined. The upsampled image that is produced in step S204 is stored in some memory within the processing module 104.

In step S206 the processing module 104 applies adaptive sharpening to the upsampled image to produce an output image. The output image is a sharpened, upsampled image. The adaptive sharpening is achieved by applying an adaptive kernel to regions of upsampled pixels in the upsampled image, wherein the weights of the kernel are adapted based the local region of upsampled pixels of the upsampled image to which the kernel is applied, such that different levels of sharpening are applied to different regions of upsampled pixels depending on local context.

In step S208 the sharpened, upsampled image 106 is output from the processing module 104.

General aims for systems implementing super resolution are: (i) high quality output images, i.e. for the output images to be maximally plausible given the low resolution input images, (ii) low latency so that output images are generated quickly, (iii) a low cost processing module in terms of resources such as power, bandwidth and silicon area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of upsampling a block of input pixels to determine a block of upsampled pixels, wherein at least one of the upsampled pixels is a diagonal pixel, wherein a diagonal pixel is at a position that is not in any of the rows nor in any of the columns of input pixels in the block of input pixels, the method comprising:

- determining indications of image gradients for the block of input pixels;
- using the determined indications of image gradients to determine one or more weighting parameters which are indicative of weights of a diagonal kernel; and
- determining the upsampled pixels of the block of upsampled pixels by applying kernels to the block of input pixels, wherein the diagonal pixel in the block of upsampled pixels is determined by applying the diagonal kernel to the block of input pixels in accordance with the determined one or more weighting parameters.

In some examples, the weighting parameters may be the weights of the diagonal kernel. In these examples the weights of the diagonal kernel are weighting parameters indicative of the weights because they are actually the weights.

Said using the determined indications of image gradients to determine one or more weighting parameters which are indicative of weights of a diagonal kernel may comprise:

- determining a weighting parameter indicative of a relatively low weight of the diagonal kernel at a position corresponding to a first input pixel on a first diagonal line passing in a first diagonal direction through the diagonal pixel position in response to the determined indications of image gradients indicating that there is a relatively high image gradient in the first diagonal direction; and
- determining a weighting parameter indicative of a relatively high weight of the diagonal kernel at a position corresponding to a second input pixel on a second diagonal line passing in a second diagonal direction through the diagonal pixel position in response to the determined indications of image gradients indicating that there is a relatively low image gradient in the second diagonal direction.

The first and second diagonal directions may be perpendicular to each other and may be both at 45 degrees to a horizontal axis of the block of input pixels.

In response to the determined indications of image gradients being non-zero the one or more weighting parameters may be determined to be indicative of anisotropic weights for the diagonal kernel.

The weights of the diagonal kernel may be normalised such that the sum of the weights in the diagonal kernel is one.

Said determining indications of image gradients for the block of input pixels may comprise:

- applying a first gradient kernel to a patch of input pixels to determine a first indication of an image gradient in a first direction, wherein the patch of input pixels includes the block of input pixels; and
- applying a second gradient kernel to the patch of input pixels to determine a second indication of an image gradient in a second direction different to the first direction.

The patch of input pixels may be larger than the block of input pixels.

The first direction may be a horizontal direction and the first indication of an image gradient, dx, may indicate a horizontal image gradient in the patch of input pixels, wherein the second direction may be a vertical direction and the second indication of an image gradient, dy, may indicate a vertical image gradient in the patch of input pixels;

- wherein said using the determined indications of image gradients to determine one or more weighting parameters which are indicative of weights of a diagonal kernel may comprise:
  - summing dx and dy to determine a first intermediate value, $\alpha$;
  - finding a difference between dx and dy to determine a second intermediate value, $\beta$; and
  - using the first and second intermediate values to determine two weighting parameters, a and b, which are used to define the weights of the diagonal kernel.

The patch of input pixels may be a 5×5 patch of input pixels, wherein the first gradient kernel may be $$\begin{bmatrix} 0 & 0 & 0 & 0 & 0 \\ -1 & -1 & 0 & 1 & 1 \\ -1 & -1 & 0 & 1 & 1 \\ -1 & -1 & 0 & 1 & 1 \\ 0 & 0 & 0 & 0 & 0 \end{bmatrix} \text{ or } \begin{bmatrix} 0 & 0 & 0 & 0 & 0 \\ 1 & 1 & 0 & -1 & -1 \\ 1 & 1 & 0 & -1 & -1 \\ 1 & 1 & 0 & -1 & -1 \\ 0 & 0 & 0 & 0 & 0 \end{bmatrix},$$

and wherein the second gradient kernel may be $$\begin{bmatrix} 0 & -1 & -1 & -1 & 0 \\ 0 & -1 & -1 & -1 & 0 \\ 0 & 0 & 0 & 0 & 0 \\ 0 & 1 & 1 & 1 & 0 \\ 0 & 1 & 1 & 1 & 0 \end{bmatrix} \text{ or } \begin{bmatrix} 0 & 1 & 1 & 1 & 0 \\ 0 & 1 & 1 & 1 & 0 \\ 0 & 0 & 0 & 0 & 0 \\ 0 & -1 & -1 & -1 & 0 \\ 0 & -1 & -1 & -1 & 0 \end{bmatrix}.$$

The first direction may be a first diagonal direction and the first indication of an image gradient may correspond to a first intermediate value, $\alpha$, and may indicate a first diagonal image gradient in the patch of input pixels, wherein the second direction may be a second diagonal direction and the second indication of an image gradient may correspond to a second intermediate value, $\beta$, and may indicate a second diagonal image gradient in the patch of input pixels; wherein said using the determined indications of image gradients to determine one or more weighting parameters which are indicative of weights of a diagonal kernel may comprise using the first and second intermediate values to determine two weighting parameters, a and b, which are used to define the weights of the diagonal kernel.

The patch of input pixels may be a 5×5 patch of input pixels, wherein the first gradient kernel may be $$\begin{bmatrix} 0 & -1 & -1 & -1 & 0 \\ -1 & -2 & -1 & 0 & 1 \\ -1 & -1 & 0 & 1 & 1 \\ -1 & 0 & 1 & 2 & 1 \\ 0 & 1 & 1 & 1 & 0 \end{bmatrix} \text{ or } \begin{bmatrix} 0 & 1 & 1 & 1 & 0 \\ 1 & 2 & 1 & 0 & -1 \\ 1 & 1 & 0 & -1 & -1 \\ 1 & 0 & -1 & -2 & -1 \\ 0 & -1 & -1 & -1 & 0 \end{bmatrix},$$

and wherein the second gradient kernel may be $$\begin{bmatrix} 0 & 1 & 1 & 1 & 0 \\ -1 & 0 & 1 & 2 & 1 \\ -1 & -1 & 0 & 1 & 1 \\ -1 & -2 & -1 & 0 & 1 \\ 0 & -1 & -1 & -1 & 0 \end{bmatrix} \text{ or } \begin{bmatrix} 0 & -1 & -1 & -1 & 0 \\ 1 & 0 & -1 & -2 & -1 \\ 1 & 1 & 0 & -1 & -1 \\ 1 & 2 & 1 & 0 & -1 \\ 0 & 1 & 1 & 1 & 0 \end{bmatrix}.$$

It may be the case that $$a = \frac{\beta}{(\alpha + \beta)} \text{ and } b = \frac{\alpha}{(\alpha + \beta)}.$$

It may be the case that $$a = \begin{cases} 1 & \text{where } \beta \geq \alpha \\ 0 & \text{where } \alpha > \beta \end{cases} \text{ and } b = \begin{cases} 0 & \text{where } \beta \geq \alpha \\ 1 & \text{where } \alpha > \beta \end{cases}.$$

It may be the case that $a=f(\alpha-\beta,m)$ and $b=f(\beta-\alpha, m)$, wherein $a+b=1$, wherein f is a function such that $$f(x, m) = \left[\frac{1}{2} - mx\right]_0^1,$$

where m is a parameter that controls how the diagonal pixel in the block of upsampled pixels is determined.

Said applying the diagonal kernel to the block of input pixels may comprise:

applying a first diagonal subkernel to the block of input pixels and multiplying the result by a first of the weighting parameters, a, to determine a first diagonal component;

applying a second diagonal subkernel to the block of input pixels and multiplying the result by a second of the weighting parameters, b, to determine a second diagonal component; and summing the first and second diagonal components to determine the diagonal pixel in the block of upsampled pixels.

The upsampled pixels in the block of upsampled pixels may be non-sharpened upsampled pixel values.

The block of input pixels may be a 2×2 block of input pixels and the diagonal kernel may be a 2×2 kernel which has weights $$\frac{1}{2}\begin{bmatrix} a & b \\ b & a \end{bmatrix}.$$

The upsampled pixels in the block of upsampled pixels may be sharpened upsampled pixel values.

The block of input pixels may be a 4×4 block of input pixels and the diagonal kernel may be a 4×4 kernel, wherein the weights of the diagonal kernel may be configured to apply sharpening to the block of input pixels.

Non-diagonal pixels in the block of upsampled pixels may be determined by applying respective fixed kernels to the block of input pixels, wherein the fixed kernels may not depend upon the determined image gradients.

The block of upsampled pixels may be a 2×2 block of upsampled pixels which has three non-diagonal upsampled pixels and one diagonal upsampled pixel.

The method may further comprise applying adaptive sharpening. The adaptive sharpening may involve processing a first block of upsampled pixels obtained from a 2×2 block of input pixels and a second block of upsampled pixels obtained from a 4×4 block of input pixels.

The block of input pixels may be obtained by decompressing compressed pixels.

There is provided a processing module configured to upsample a block of input pixels to determine a block of upsampled pixels, wherein at least one of the upsampled pixels is a diagonal pixel, wherein a diagonal pixel is at a position that is not in any of the rows nor in any of the columns of input pixels in the block of input pixels, the processing module comprising:

gradient determining logic configured to determine indications of image gradients for the block of input pixels;

weighting parameter determining logic configured to use the determined indications of image gradients to determine one or more weighting parameters which are indicative of weights of a diagonal kernel; and pixel determining logic configured to determine the upsampled pixels of the block of upsampled pixels by applying kernels to the block of input pixels, wherein the pixel determining logic comprises diagonal kernel application logic configured to determine the diagonal pixel in the block of upsampled pixels by applying the diagonal kernel to the block of input pixels in accordance with the determined one or more weighting parameters.

Said diagonal kernel application logic comprises:

first diagonal subkernel application logic configured to apply a first diagonal subkernel to the block of input pixels;

first multiplication logic configured to multiply the result of applying the first diagonal subkernel to the block of input pixels by a first of the weighting parameters, a, to determine a first diagonal component;

second diagonal subkernel application logic configured to apply a second diagonal subkernel to the block of input pixels;

second multiplication logic configured to multiply the result of applying the second diagonal subkernel to the block of input pixels by a second of the weighting parameters, b, to determine a second diagonal component; and summation logic configured to sum the first and second diagonal components to determine the diagonal pixel in the block of upsampled pixels.

There may be provided a processing module configured to perform any of the methods described herein.

There may be provided a method of applying adaptive sharpening, for a block of input pixels for which processing is performed, to determine a block of output pixels, the method comprising:

obtaining a block of non-sharp processed pixels based on the block of input pixels, the block of non-sharp processed pixels being for representing a non-sharp version of the block of output pixels;

obtaining a block of sharp processed pixels based on the block of input pixels, the block of sharp processed pixels being for representing a sharp version of the block of output pixels;

determining one or more indications of contrast for the block of input pixels; and determining each of the output pixels of the block of output pixels by performing a respective weighted sum of: (i) a corresponding non-sharp processed pixel in the block of non-sharp processed pixels and (ii) a corresponding sharp processed pixel in the block of sharp processed pixels, wherein the weights of the weighted sums are based on the determined one or more indications of contrast for the block of input pixels.

There may be provided a processing module configured to apply adaptive sharpening, for a block of input pixels for which processing is performed, to determine a block of output pixels, the processing module comprising:

contrast determination logic configured to determine one or more indications of contrast for the block of input pixels; and output pixel determination logic configured to:

receive a block of non-sharp processed pixels based on the block of input pixels, the block of non-sharp processed pixels being for representing a non-sharp version of the block of output pixels;

receive a block of sharp processed pixels based on the block of input pixels, the block of sharp processed pixels being for representing a sharp version of the block of output pixels; and determine each of the output pixels of the block of output pixels by performing a respective weighted sum of: (i) a corresponding non-sharp processed pixel in the block of non-sharp processed pixels and (ii) a corresponding sharp processed pixel in the block of sharp processed pixels, wherein the weights of the weighted sums are based on the determined one or more indications of contrast for the block of input pixels.

There may be provided a method of applying adaptive sharpening, for a block of input pixels, to determine a block of output pixels, the method comprising:

obtaining a block of sharp pixels based on the block of input pixels, the block of sharp pixels being for representing a sharp version of the block of output pixels;

determining one or more indications of contrast for the block of input pixels; and determining each of the output pixels of the block of output pixels by performing a respective weighted sum of: (i) a corresponding input pixel in the block of input pixels and (ii) a corresponding sharp pixel in the block of sharp pixels, wherein the weights of the weighted sums are based on the determined one or more indications of contrast for the block of input pixels.

There may be provided a processing module configured to apply adaptive sharpening, for a block of input pixels, to determine a block of output pixels, the processing module comprising:

contrast determination logic configured to determine one or more indications of contrast for the block of input pixels; and output pixel determination logic configured to:

receive a block of sharp pixels based on the block of input pixels, the block of sharp pixels being for representing a sharp version of the block of output pixels; and determine each of the output pixels of the block of output pixels by performing a respective weighted sum of: (i) a corresponding input pixel in the block of input pixels and (ii) a corresponding sharp pixel in the block of sharp pixels, wherein the weights of the weighted sums are based on the determined one or more indications of contrast for the block of input pixels.

The processing module may be embodied in hardware on an integrated circuit. There may be provided a method of manufacturing, at an integrated circuit manufacturing system, a processing module. There may be provided an integrated circuit definition dataset that, when processed in an integrated circuit manufacturing system, configures the system to manufacture a processing module. There may be provided a non-transitory computer readable storage medium having stored thereon a computer readable description of a processing module that, when processed in an integrated circuit manufacturing system, causes the integrated circuit manufacturing system to manufacture an integrated circuit embodying a processing module.

There may be provided an integrated circuit manufacturing system comprising: a non-transitory computer readable storage medium having stored thereon a computer readable description of the processing module; a layout processing system configured to process the computer readable description so as to generate a circuit layout description of an integrated circuit embodying the processing module; and an integrated circuit generation system configured to manufacture the processing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
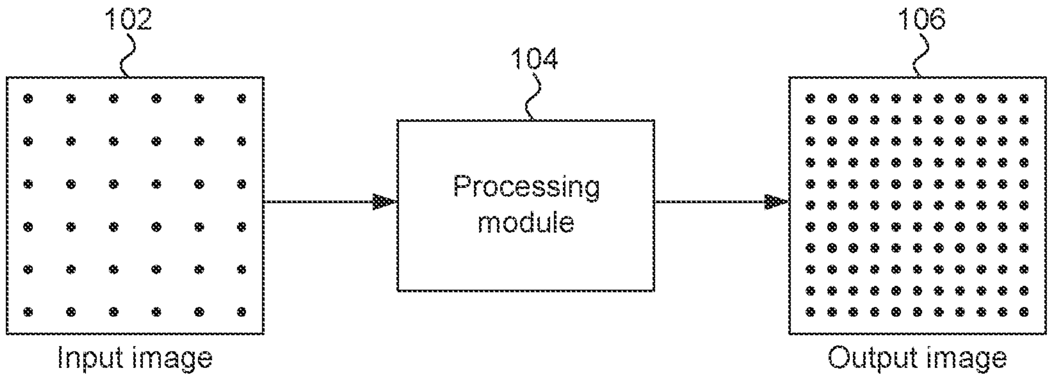
FIG. 1 illustrates an upsampling process.
Figure 2:
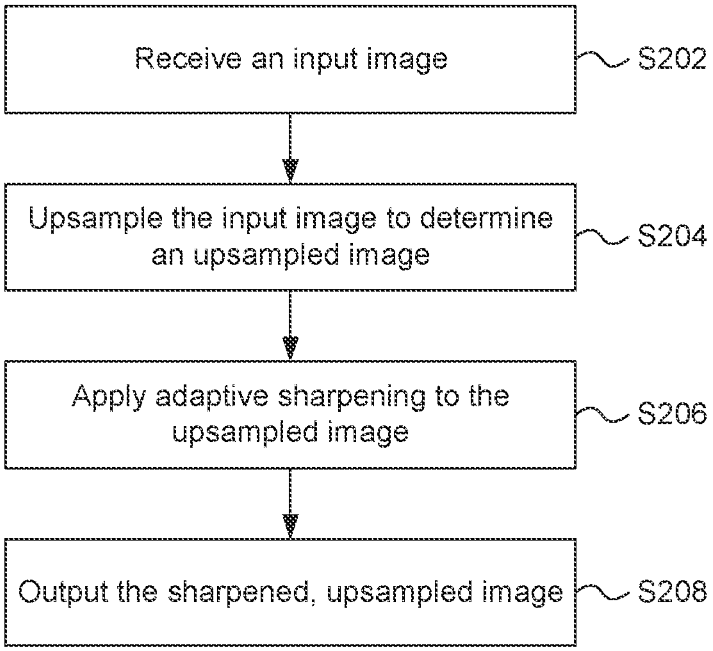
FIG. 2 is a flow chart for a process of performing super resolution by performing upsampling and adaptive sharpening in two stages of processing.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. The super resolution techniques described herein implement upsampling and adaptive sharpening. It is noted that the memory in the system described in the background section that is used to store the upsampled image that is produced in step S204 takes up a significant amount of silicon area, and writing data to and reading data from the memory adds significant latency, bandwidth and power consumption to that system. Here “bandwidth” refers to the amount of data that is transferred to and from the memory per unit time. In contrast, in examples described herein a memory for storing an upsampled image prior to applying adaptive sharpening is not needed. Furthermore, examples described herein provide improvements to: (i) the upsampling process, (ii) the adaptive sharpening process, and (iii) the way in which the upsampling and adaptive sharpening processes are combined. In particular, examples described herein provide high quality results (in terms of the high resolution output pixels being highly plausible given the low resolution input images, with a reduction in artefacts such as blurring and ‘staircasing’ (a common result of aliasing in computer-generated images) in the output image) and can be implemented in more efficient systems with reduced latency, power consumption and/or silicon area compared to prior art super resolution systems.

Overlapping blocks of input pixels of an input image are processed, where the blocks of input pixels are processed to generate respective non-overlapping blocks of output pixels. As described in examples below which implement 2× upsampling, for each input pixel of the input image, a block of input pixels may be processed to generate a 2×2 block of output pixels.

The improvements to the upsampling process take account of image gradients (i.e. the rates of change of pixel values in different directions at different positions within the input image). For example, an edge in an image causes a high image gradient in a direction perpendicular to the edge, but a low image gradient in a direction parallel to the edge. When determining an upsampled pixel by performing a weighted sum of input pixels the upsampling process can weight the input pixels differently according to the image gradients. This can reduce blurring and staircasing artefacts near edges compared to when a bilinear upsampling technique is used. Furthermore, the examples described below are efficient to implement, e.g. in hardware, (whilst providing surprisingly beneficial effects) such that they have low latency, low power consumption and small silicon area (when implemented in fixed function hardware).

The improvements to the adaptive sharpening process avoid a need to alter the weights in the kernels applied to blocks of input pixels in order to alter the amount of sharpening that is applied to different regions of output pixels. This is achieved by obtaining both: (i) a block of non-sharp upsampled pixels, and (ii) a block of sharp upsampled pixels, and then performing weighted sums of the corresponding pixels in the two blocks of upsampled pixels in order to determine a block of output pixels to which adaptive sharpening has been applied. This adaptive sharpening is achieved by means of determining the weights of each weighted sum based on an indication of contrast for the corresponding block of input pixels. For example, for blocks of input pixels with low contrast, the weight for the sharp upsampled pixels is chosen to be larger than the weight for the non-sharp upsampled pixels so that the output pixels are similar to the sharp upsampled pixels. However, for blocks of input pixels with high contrast, the weight for the sharp upsampled pixels is chosen to be smaller than the weight for the non-sharp upsampled pixels so that the output pixels are similar to the non-sharp upsampled pixels. In this way, more sharpening is applied to regions of low contrast in the image than to regions of high contrast in the image. This can help to maintain detail in regions of low contrast, and it avoids artefacts (such as 'overshoot') which can occur when too much sharpening is applied in regions of high contrast (e.g. around edges between regions with large differences in pixel value).

The format of the pixels could be different in different examples. For example, the pixels could be in YUV format, and the upsampling may be applied to each of the Y, U and V channels separately. In some other examples upsampling weights could be calculated and applied to just the Y channel, or they could be calculated based on just the Y channel and applied to the Y, U and V channels. The Y channel can be adaptively sharpened as described herein. The human visual system is not as perceptive to detail at high spatial frequencies in the U and V channels as in the Y channel, so the U and V channels may or may not be adaptively sharpened and/or upsampled taking account of image gradients. If the input pixel data is in RGB format then it could be converted into YUV format (e.g. using a known colour space conversion technique) and then processed as data in Y, U and V channels. Alternatively, if the input pixel data is in RGB format then the techniques described herein could be implemented on the R, G and B channels as described herein, wherein the G channel may be considered to be a proxy for the Y channel.

Upsampling

Figure 3A:
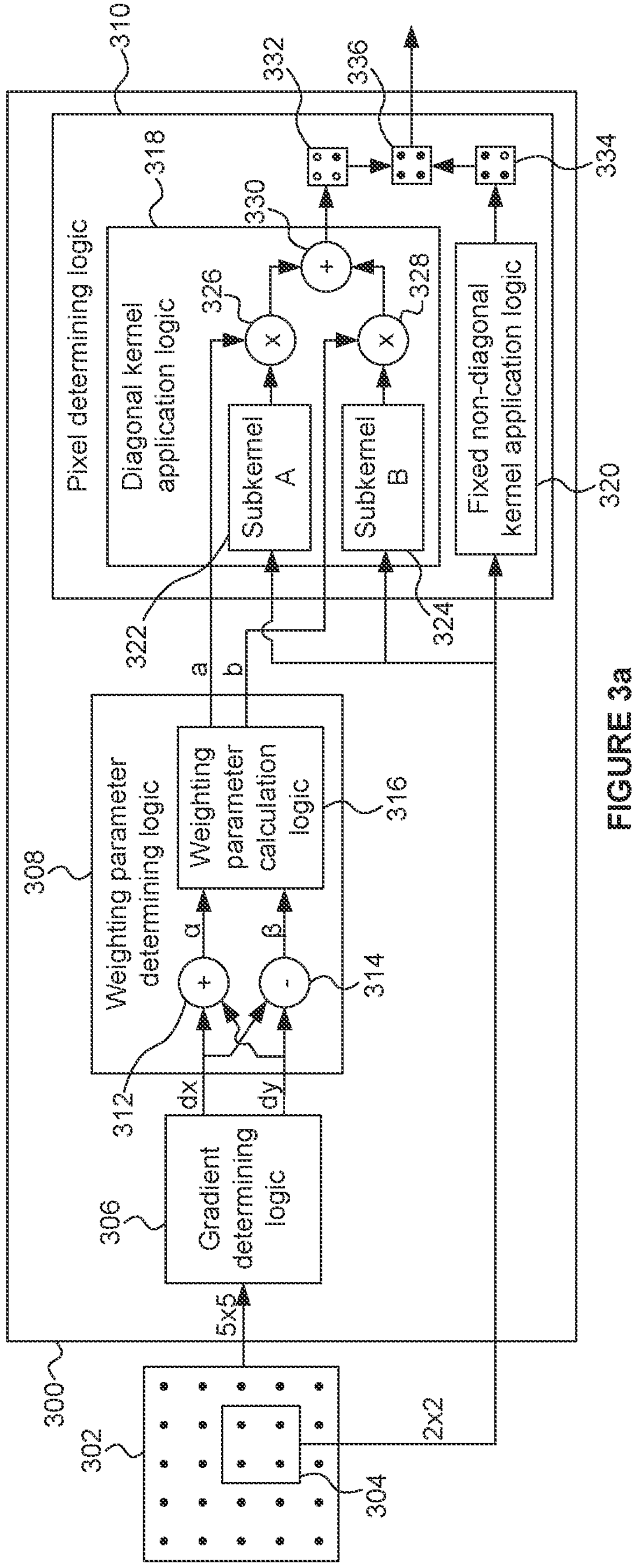
FIG. 3*a* shows a processing module configured to upsample a block of input pixels to determine a block of upsampled pixels according to a first example described herein.
Figure 3B:
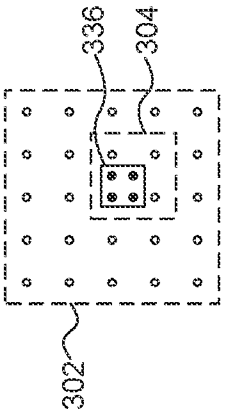
FIG. 3*b* illustrates how the block of upsampled pixels determined by the processing module in FIG. 3*a* relates to the block of input pixels.

FIG. 3*a* shows a processing module 300 configured to upsample a block of input pixels 304 within a patch of input pixels 302 to determine a block of upsampled pixels 336, e.g. for use in implementing a super resolution technique. FIG. 3*b* illustrates how the block of upsampled pixels 336 determined by the processing module 300 relates to the block of input pixels 304 within the patch of input pixels 302.

Rather than using bilinear upsampling (which is the most common conventional upsampling approach), the processing module 300 performs upsampling which is dependent upon image gradients in the patch of input pixels 302. In this way, the upsampling takes account of edges in the image, to reduce 'staircasing' artefacts that can occur near edges, particularly diagonal edges of computer-generated images, compared to the case where bilinear upsampling is used.

The processing module 300 comprises gradient determining logic 306, weighting parameter determining logic 308 and pixel determining logic 310. The weighting parameter determining logic 308 comprises summation logic 312, subtraction logic 314 and weighting parameter calculation logic 316. The pixel determining logic 310 comprises diagonal kernel application logic 318 and fixed non-diagonal kernel application logic 320. The diagonal kernel application logic 318 comprises first diagonal subkernel application logic 322, second diagonal subkernel application logic 324, first multiplication logic 326, second multiplication logic 328 and summation logic 330. The logic of the processing module 300 may be implemented in hardware, software, or a combination thereof. A hardware implementation normally provides for a reduced latency and power consumption compared to a software implementation, at the cost of inflexibility of operation. The processing module 300 is likely to be used in the same manner a large number of times on each image being upsampled, and since latency is very important in, for example, real time super resolution applications, it is likely that implementing the logic of the processing module 300 in hardware (e.g. in fixed function circuitry) will be preferable to implementing the logic in software. However, a software implementation is still possible and may be preferable in some situations.

A method of using the processing module 300 to upsample the block of input pixels 304 to determine the block of upsampled pixels 336, e.g. for use in implementing a super resolution technique, is described with reference to the flow chart of FIG. 4. At least one of the upsampled pixels in the block of upsampled pixels 336 is a diagonal pixel. A 'diagonal pixel' is at a position that is not in any of the rows nor in any of the columns of input pixels in the block of input pixels 304. As shown in FIG. 3*b*, the bottom right upsampled pixel in the block of upsampled pixels 336 is a diagonal pixel because it is not in any of the rows nor in any of the columns of input pixels in the block of inputs pixels 304. In this example in which 2× upsampling is performed to generate a 2×2 block of upsampled pixels 336, there is just one diagonal pixel in the block of upsampled pixels 336, with the other three upsampled pixels in the block 336 being non-diagonal pixels because they are in a row and/or a column of input pixels in the block of input pixels. In other examples there may be more than one diagonal pixel in the block of upsampled pixels, e.g. if different upsampling factors are applied. As explained below, fixed kernels (which do not depend on image gradients) are applied for determining non-diagonal pixels in the block of upsampled pixels 336, whilst a diagonal kernel which is applied for determining the diagonal pixel in the block of upsampled pixels 336 has weights which depend upon image gradients.

In step S402 the patch of input pixels 302 is received at the processing module 300. The patch of input pixels 302 includes the block of input pixels 304. In the example shown in FIG. 3*a*, the patch of input pixels 302 is a 5×5 patch of input pixels and the block of input pixels 304 is a 2×2 block of input pixels within the patch, but in other examples the shapes and/or sizes of the patch and block of input pixels may be different. In some examples the patch of input pixels 302 may be the same as the block of input pixels 304. The patch of input pixels 302 is part of an input image. For example, an input image may be an 960×540 image (i.e. an image with 518,400 pixels arranged into 960 columns and 540 rows). In the example shown in FIG. 3*a*, at least four rows of input pixels of the input image may be stored in line stores (also known in the art as "line buffers" or "delay lines") so that a sequential stream of input pixels can be buffered to allow the 5×5 patch 302 to be provided to the processing module 300. The input image may be captured (e.g. by a camera) or may be a computer generated image (e.g. a rendered image of a scene which has been rendered by a GPU using a rendering technique such as rasterization or ray tracing).

In step S404 the gradient determining logic 306 determines indications of image gradients for the block of input pixels 304. In order to determine the indications of image gradients for the block of input pixels 304, the gradient determining logic 306 receives and operates on the patch of input pixels 302 (which includes, and may be larger than, the block of input pixels 304). Indications of two image gradients in different directions may be determined. In this case, the gradient determining logic 306 applies a first gradient kernel to the patch of input pixels 302 to determine a first indication of an image gradient in a first direction, and applies a second gradient kernel to the patch of input pixels 302 to determine a second indication of an image gradient in a second direction different to the first direction. The first and second directions are non-parallel, e.g. they may be perpendicular.

In a first example, shown in FIG. 3*a*, the first direction is a horizontal direction and the first indication of an image gradient, dx, indicates a horizontal image gradient in the patch of input pixels 302; and the second direction is a vertical direction and the second indication of an image gradient, dy, indicates a vertical image gradient in the patch of input pixels 302.

The first gradient kernel which is applied to the patch of input pixels 302 may be $$\begin{bmatrix} 0 & 0 & 0 & 0 & 0 \\ -1 & -1 & 0 & 1 & 1 \\ -1 & -1 & 0 & 1 & 1 \\ -1 & -1 & 0 & 1 & 1 \\ 0 & 0 & 0 & 0 & 0 \end{bmatrix}.$$

The first gradient kernel may be represented as $$\begin{bmatrix} -1 & -1 & 0 & 1 & 1 \\ -1 & -1 & 0 & 1 & 1 \\ -1 & -1 & 0 & 1 & 1 \end{bmatrix}$$

because the weights in the top and bottom rows are all zeros. "Applying" a kernel to the patch of input pixels 302 means that a weighted sum of the input pixels in the patch 302 is performed using the kernel values as weights of the weighted sum. So applying the first gradient kernel to the patch of input pixels 302 will output a scalar value, dx, which indicates an image gradient in the positive x direction (i.e. to the right in this example). It is noted that dx may be positive, zero or negative. In other examples, the first gradient kernel could be defined to be the negative of the kernel given above, such that the resulting scalar indication of an image gradient would indicate an image gradient in the negative x direction (i.e. to the left in this example).

The second gradient kernel which is applied to the patch of input pixels 302 may be $$\begin{bmatrix} 0 & -1 & -1 & -1 & 0 \\ 0 & -1 & -1 & -1 & 0 \\ 0 & 0 & 0 & 0 & 0 \\ 0 & 1 & 1 & 1 & 0 \\ 0 & 1 & 1 & 1 & 0 \end{bmatrix}.$$

The second gradient kernel may be represented as $$\begin{bmatrix} -1 & -1 & -1 \\ -1 & -1 & -1 \\ 0 & 0 & 0 \\ 1 & 1 & 1 \\ 1 & 1 & 1 \end{bmatrix}$$

because the weights in the leftmost and rightmost columns are all zeros. Applying the second gradient kernel to the patch of input pixels 302 will output a scalar value, dy, which indicates an image gradient in the positive y direction (i.e. downwards in this example). It is noted that dy may be positive, zero or negative. In other examples, the second gradient kernel could be defined to be the negative of the kernel given above, such that the resulting scalar indication of an image gradient would indicate an image gradient in the negative y direction (i.e. upwards in this example).

The patch 302 is chosen to be a 5×5 patch of input pixels and the kernels are defined as given above in this example because this has been found to provide edge detection that is not too blurry or noisy and it is simple to implement. The determined indications of image gradients (e.g. dx and dy) provide an overall edge direction for the whole patch, so that the diagonal pixel 332 can be filtered in such a way that it conforms to the edge (where present) as explained in more detail below. If smaller kernels were used, e.g. 1×3 and 3×1 edge detection kernels [−1 0 1] and $$\begin{bmatrix} -1 \\ 0 \\ 1 \end{bmatrix},$$

the context of the edge would not be taken into account enough, so the edges may end up being very noisy, thereby reducing the benefit of the algorithm. The larger kernels proposed above (e.g. the 5×5 or 5×3 or 3×5 kernels proposed above) can be constructed by taking an average (i.e. blurring the edge vectors to reduce the noise and take into account more context) of the simple 3×3 edge detection kernels given above, for example by convolving these 1×3 and 3×1 edge detection kernels with a 3×3 box filter of ones. This convolution can be folded in the edge detection kernels, which yields the 5×5 or 5×3 or 3×5 kernels proposed above. It is noted that all of the weights in the first and second gradient kernels given above are −1, 0 or +1 so the weighted sums that are determined when applying these kernels to the patch of input pixels are very simple to implement (e.g. as additions and subtractions), particularly in fixed function hardware. Furthermore, the sum of the values within each of the first and second gradient kernels is zero, so applying the gradient kernels to the patch of input pixels 302 does not bias the values of dx and dy (either positively or negatively). The values of dx and dy are output from the gradient determining logic 306 and are provided to the weighting parameter determining logic 308.

Figure 5A:
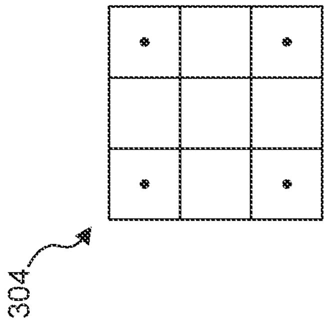
FIG. 5*a* illustrates a 2×2 block of input pixels.
Figure 5B:
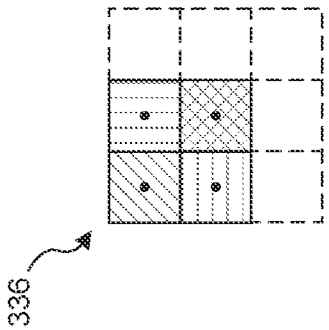
FIG. 5*b* illustrates a 2×2 block of upsampled pixels.

FIGS. 5*a* to 5*h* and 6*a* and 6*b* illustrate various properties with respect to a 3×3 square. In particular, FIG. 5*a* illustrates the 2×2 block of input pixels 304 in the four corners of a 3×3 square, and FIG. 5*b* illustrates the 2×2 block of upsampled pixels 336 with respect to the same 3×3 square. In FIGS. 5*a* and 5*b* the pixels are represented with black dots.

Figure 6A:
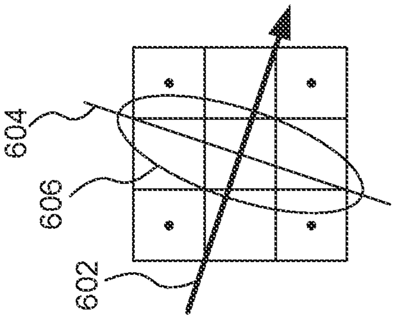
FIG. 6*a* shows an image gradient vector and a corresponding representation of a shape of the diagonal kernel.

The values of dx and dy can be considered to be components of an image gradient vector passing through the diagonal pixel, i.e. the image gradient vector is [dx, dy], with dx and dy being scalar values. This is a slight approximation because strictly speaking the centroid of the edge detection kernels used to determine the values of dx and dy is located at the top left pixel of the 2×2 block of input pixels 304, but this is normally a very close approximation so it is unlikely to result in noticeable artefacts. FIG. 6*a* shows the image gradient vector 602 passing through the centre of the 3×3 square. In the example shown in FIG. 6*a*, dx and dy are positive (such that the vector 602 points diagonally to the right and downwards) and the magnitude of dx is greater than the magnitude of dy (such that the vector 602 is closer to being horizontal than to being vertical). FIG. 6*a* also shows a line 604 that is perpendicular to the vector 602 and intersects the vector 602 at the position of the diagonal pixel, i.e. in the centre of the 3×3 square shown in FIG. 6*a*. The line 604 can be considered to represent an edge direction because the image gradient at the diagonal pixel is perpendicular to the line 604, and by definition an image gradient on an edge is perpendicular to the direction of the edge. FIG. 6*a* also shows an ellipse 606 to represent a shape of the diagonal kernel (that is, it indicates a convolution kernel that could be applied to the 2×2 block of input pixels 304 to determine a suitable value of the diagonal pixel). The ellipse is an indication of the relative strength of contributions (i.e. the weights) of each of the four neighbouring input pixels 304 to the diagonal output pixel. The ellipse 606 is described herein only as an explanatory device useful for understanding the idea of edge-aligned filtering for reconstructing the diagonal pixel, and imparting the intuition behind the method: the ellipse 606 is not actually used in the implementations described herein. The centre of the ellipse is at the position of the diagonal pixel, i.e. in the centre of the 3×3 square shown in FIG. 6*a*; the major axis of the ellipse 606 is aligned with the line 604; and the minor axis of the ellipse 606 is aligned with the vector 602. It is noted that the ellipse is rotationally symmetric with an order of rotational symmetry of two, indicating that opposing corners (top left and bottom right, and top right and bottom left) should have equal weights. Furthermore, the ellipse is closer to the top right and bottom left input pixels than it is to the top left and bottom right input pixels, indicating that larger weights should be chosen for the top right and bottom left input pixels than for the top left and bottom right input pixels. In other words, the ellipse indicates an edge-aligned filter, the weights of pixels aligned with the edge direction being given a greater contribution to the output pixel than those not aligned with the edge direction. This gives much improved edge reconstruction and reduces the appearance of aliasing/staircasing in the output image.

Figure 6B:
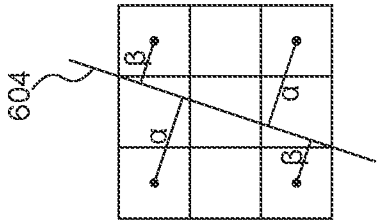
FIG. 6*b* shows first and second intermediate values, $\alpha$ and $\beta$, for use in determining weighting parameters which are indicative of weights of the diagonal kernel.

In step S406 the weighting parameter determining logic 308 uses the determined indications of image gradients (e.g. dx and dy) to determine one or more weighting parameters (e.g. "a" and "b") which are indicative of weights of the diagonal kernel. For example, the weighting parameter determining logic 308 may use the summation logic 312 to sum dx and dy and take the magnitude of the result to determine a first intermediate value, α, and may use the subtraction logic 314 to find a difference between dx and dy to determine a second intermediate value, β. To put this another way, $\alpha=|dx+dy|$ and $\beta=|dx-dy|$. As described above, dx and dy may each be positive, zero or negative, whereas α and β are non-negative. FIG. 6*b* illustrates what is represented by the intermediate values α and β. In particular, the first intermediate value α represents the shortest distance from the top left of the input pixels in the block of input pixels (or from the bottom right of the input pixels in the block of input pixels) to the line 604; and the second intermediate value β represents the shortest distance from the top right of the input pixels in the block of input pixels (or from the bottom left of the input pixels in the block of input pixels) to the line 604. The first and second intermediate values, α and β, are passed to the weighting parameter calculation logic 316. for use in determining weighting parameters (a and b) which are indicative of weights of the diagonal kernel. In some examples the edge vector [dx, dy] may be normalised to unit length before computing α and β, such that α and β correspond exactly to the distances to the line 604 as shown in FIG. 6*b*. However, in the present example, this is unnecessary since normalisation is carried out during calculation of the weighting parameters a and b.

Figure 5C:
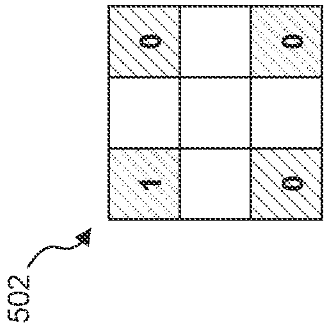
FIG. 5*c* illustrates a first fixed kernel to be applied to the 2×2 block of input pixels shown in FIG. 5*a* to determine the top left upsampled pixel in the 2×2 block of upsampled pixels shown in FIG. 5*b;*
Figure 5D:
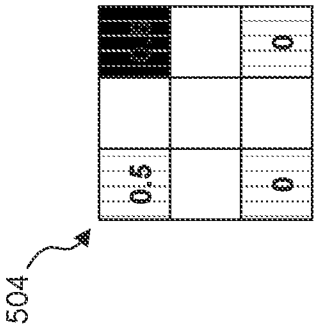
FIG. 5*d* illustrates a second fixed kernel to be applied to the 2×2 block of input pixels shown in FIG. 5*a* to determine the top right upsampled pixel in the 2×2 block of upsampled pixels shown in FIG. 5*b;*
Figure 5E:
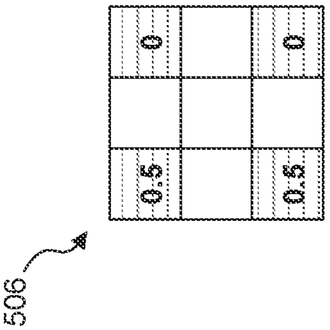
FIG. 5*e* illustrates a third fixed kernel to be applied to the 2×2 block of input pixels shown in FIG. 5*a* to determine the bottom left upsampled pixel in the 2×2 block of upsampled pixels shown in FIG. 5*b;*
Figure 5F:
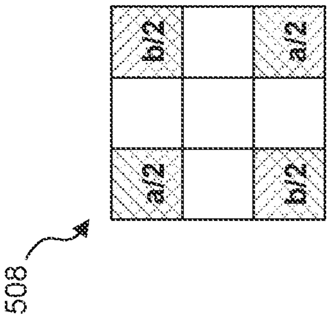
FIG. 5*f* illustrates a diagonal kernel to be applied to the 2×2 block of input pixels shown in FIG. 5*a* to determine the bottom right upsampled pixel in the 2×2 block of upsampled pixels shown in FIG. 5*b;*

The weighting parameter calculation logic 316 uses the first and second intermediate values, α and β, to determine two weighting parameters, a and b, which are used to define the weights of the diagonal kernel. FIG. 5*f* shows the weights of the diagonal kernel in this example. In particular, the diagonal kernel is a 2×2 kernel which has weights of $$\frac{1}{2}\begin{bmatrix} a & b \\ b & a \end{bmatrix}.$$

The diagonal kernel is rotationally symmetric with an order of rotational symmetry of two. In examples described herein, due to the rotational symmetry only two weighting parameters (a and b) are used, rather than having four separate weighting parameters. The diagonal kernel is normalised, so the weights of the diagonal kernel add up to 1. Therefore in this example, a+b=1. This means that as one of a or b increases the other decreases. If the parameters are set such that a=b=0.5 then the system in this example will give the same outputs as a bilinear upsampler, and the weights of the diagonal kernel may be said to be "isotropic". However, in the system described herein, a and b can be different, i.e. we can have $a\neq b$. In this way, if the determined indications of image gradients are non-zero (such that $dx\neq 0$ and $dy\neq 0$), then the weighting parameters (a and b) are determined to be indicative of anisotropic weights for the diagonal kernel.

Furthermore, a and b are determined such that the closer one of the input pixels is to the line 604, the greater is the weight applied to that input pixel when the diagonal kernel is applied to the block of input pixels. Furthermore, in examples described herein (but not in other possible examples), a and b are determined such that when an input pixel is on the line 604 a weight of 0.5 is applied to that input pixel and to the input pixel diagonally opposite it in the block of input pixels, whilst a weight of 0 is applied to the other input pixels in the block of input pixels.

There are different ways in which the weighting parameters can be determined from the intermediate values that satisfy the conditions mentioned above, some of which are given below. Furthermore, in some examples only a single weighting parameter (e.g. a) is calculated, and the value of the other weighting parameter (e.g. b) is determined from the calculated weighting parameter, e.g. as (1−a).

In a first example, the weighting parameters are determined as $$a = \frac{\beta}{(\alpha+\beta)} \text{ and } b = \frac{\alpha}{(\alpha+\beta)}.$$

In a second example, the weighting parameters are determined as $$a = \begin{cases} 1 & \text{where } \beta \geq \alpha \\ 0 & \text{where } \alpha > \beta \end{cases} \text{ and } b = \begin{cases} 0 & \text{where } \beta \geq \alpha \\ 1 & \text{where } \alpha > \beta \end{cases}.$$

In a third example, the weighting parameters are determined as a=f(α−β, m) and b=f(β−α, m) or b=1−a, wherein f is a function such that $$f(x, m) = \left[\frac{1}{2} - mx\right]_0^1,$$

where m is a tuneable parameter that controls how the diagonal pixel in the block of upsampled pixels is determined and $$[\cdot]_0^1$$

clips the output between 0 and 1. Tuneable parameters may be set, e.g. via registers, to change the behaviour of the processing module as desired.

In the examples described above, the weighting parameter b is larger than the weighting parameter a if the vector 602 is pointing into the bottom right or top left quadrant (i.e. if dx and dy have the same sign); whereas the weighting parameter b is smaller than the weighting parameter a if the vector 602 is pointing into the bottom left or top right quadrant (i.e. if dx and dy have different signs).

In other words, the weighting parameter determining logic 308 determines a weighting parameter indicative of a relatively low weight of the diagonal kernel at a position corresponding to a first input pixel (e.g. the top left input pixel or bottom right input pixel) on a first diagonal line passing in a first diagonal direction through the diagonal pixel position in response to the determined indications of image gradients indicating that there is a relatively high image gradient in the first diagonal direction; and the weighting parameter determining logic 308 determines a weighting parameter indicative of a relatively high weight of the diagonal kernel at a position corresponding to a second input pixel (e.g. the top right input pixel or bottom left input pixel) on a second diagonal line passing in a second diagonal direction through the diagonal pixel position in response to the determined indications of image gradients indicating that there is a relatively low image gradient in the second diagonal direction. The first and second diagonal directions are perpendicular to each other and are both at 45 degrees to a horizontal axis of the block of input pixels. In the example shown in FIG. 6*a* the image gradient vector is closer to the first diagonal direction (i.e. passing through the top left and bottom right input pixels) than to the second diagonal direction (i.e. passing through the bottom left and top right input pixels), so the weights of the diagonal kernel corresponding to the top left and bottom right input pixels are smaller than the weights of the diagonal kernel corresponding to the top right and bottom left input pixels. In other words, in this example, a<b.

The pixel determining logic 310 receives the weighting parameters a and b from the weighting parameter determining logic 308. The pixel determining logic 310 also receives the block of input pixels 304. In step S408 the pixel determining logic 310 determines the upsampled pixels of the block of upsampled pixels 336 by applying kernels to the block of input pixels.

The block of upsampled pixels 336 is a 2×2 block of upsampled pixels which has three non-diagonal upsampled pixels 334 and one diagonal upsampled pixel 332. The fixed non-diagonal kernel application logic 320 determines the non-diagonal pixels 334 in the block of upsampled pixels 336 by applying respective fixed kernels to the block of input pixels 304. The fixed kernels do not depend upon the determined image gradients. For example, FIG. 5*c* shows a first fixed kernel 502 to be applied to the block of input pixels 304 to determine the top left upsampled pixel in the block of upsampled pixels 336. The first fixed kernel has weights of $$\begin{bmatrix} 1 & 0 \\ 0 & 0 \end{bmatrix}$$

so when it is applied to the block of input pixels 304 the result is equal to the top left input pixel in the block of input pixels. Therefore, applying the first fixed kernel 502 to the block of input pixels does not involve performing any calculations. FIG. 5*d* shows a second fixed kernel 504 to be applied to the block of input pixels 304 to determine the top right upsampled pixel in the block of upsampled pixels 336. The second fixed kernel has weights of $$\begin{bmatrix} 0.5 & 0.5 \\ 0 & 0 \end{bmatrix}$$

so when it is applied to the block of input pixels 304 the result is equal to the sum of the top left and top right input pixels in the block of input pixels, divided by two. Division by two is simple to implement as a binary shift by one binary place to the right, which does not require logic (for example, the least significant bit may simply be discarded, or not output from the sum). Therefore, applying the second fixed kernel 504 to the block of input pixels involves performing only very simple operations: addition and (implicit) binary shifting. FIG. 5*e* shows a third fixed kernel 506 to be applied to the block of input pixels 304 to determine the bottom left upsampled pixel in the block of upsampled pixels 336. The third fixed kernel has weights of $$\begin{bmatrix} 0.5 & 0 \\ 0.5 & 0 \end{bmatrix}$$

so when it is applied to the block of input pixels 304 the result is equal to the sum of the top left and bottom left input pixels in the block of input pixels, divided by two. As mentioned above, division by two is simple to implement as a binary shift by one binary place to the right. Therefore, applying the third fixed kernel 506 to the block of input pixels involves performing only very simple operations: addition and binary shifting.

The diagonal kernel application logic 318 determines the diagonal pixel 332 in the block of upsampled pixels 336 by applying the diagonal kernel to the block of input pixels 304 in accordance with the weighting parameters a and b. As mentioned above, FIG. 5*f* shows the diagonal kernel 508 to be applied to the block of input pixels 304 to determine the bottom right upsampled pixel (i.e. the "diagonal pixel") in the block of upsampled pixels 336. The diagonal kernel has weights of $$\frac{1}{2}\begin{bmatrix} a & b \\ b & a \end{bmatrix}.$$

Figure 5G:
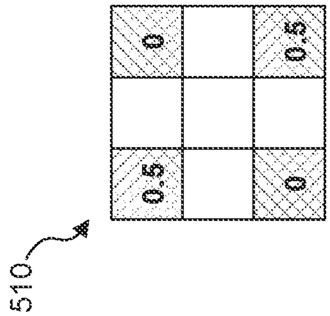
FIG. 5*g* illustrates a first diagonal subkernel to be applied to the 2×2 block of input pixels shown in FIG. 5*a* for use in applying the diagonal kernel to the 2×2 block of input pixels shown in FIG. 5*a;*
Figure 5H:
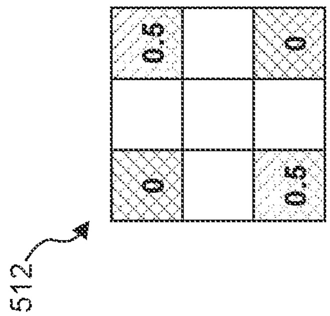
FIG. 5*h* illustrates a second diagonal subkernel to be applied to the 2×2 block of input pixels shown in FIG. 5*a* for use in applying the diagonal kernel to the 2×2 block of input pixels shown in FIG. 5*a;*

The diagonal kernel application logic 318 determines the diagonal pixel by applying a set of one or more kernels which is equivalent to applying the diagonal kernel. For example, the diagonal kernel application logic 318 can apply the diagonal kernel 508 to the block of input pixels 304 by:

- using the first diagonal subkernel application logic 322 to apply a first diagonal subkernel 510 (as shown in FIG. 5*g*) to the block of input pixels 304;
- using the first multiplication logic 326 to multiply the result of applying the first diagonal subkernel 510 to the block of input pixels 304 by a first of the weighting parameters, a, to determine a first diagonal component;
- using the second diagonal subkernel application logic 324 to apply a second diagonal subkernel 512 (as shown in FIG. 5*h*) to the block of input pixels 304;
- using the second multiplication logic 328 to multiply the result of applying the second diagonal subkernel 512 to the block of input pixels 304 by a second of the weighting parameters, b, to determine a second diagonal component; and
- using the summation logic 330 to sum the first and second diagonal components to determine the diagonal pixel 332 in the block of upsampled pixels 336.

The first diagonal subkernel 510 has weights of $$\begin{bmatrix} 0.5 & 0 \\ 0 & 0.5 \end{bmatrix}$$

so when it is applied to the block of input pixels 304 the result is equal to the sum of the top left and bottom right input pixels in the block of input pixels, divided by two. Furthermore, the second diagonal subkernel 512 has weights of $$\begin{bmatrix} 0 & 0.5 \\ 0.5 & 0 \end{bmatrix}$$

so when it is applied to the block of input pixels 304 the result is equal to the sum of the top right and bottom left input pixels in the block of input pixels, divided by two. As mentioned above, division by two is simple to implement as a binary shift by one binary place to the right, which does not require logic (for example, the least significant bit may simply be discarded, or not output from the sum. Therefore, applying the first and second diagonal subkernels 510 and 512 to the block of input pixels involves performing only very simple operations: addition and (implicit) binary shifting. The multiplications performed by the first multiplication logic 326 and the second multiplication logic 328 and the summation performed by the summation logic 330 are also simple operations to implement, e.g. in hardware. Therefore, all of the operations performed by the pixel determining logic 310 are simple and cheap to implement.

In step S410 the block of upsampled pixels 336 is output from the pixel determining logic 310. In some systems this could be the end of the processing on the block of upsampled pixels 336 and it could be output from the processing module 300 as shown in FIG. 3. In other examples, e.g. as described below, adaptive sharpening may be applied to the upsampled pixel values before they are output from the processing module.

As mentioned above, in examples described herein, overlapping blocks of input pixels of an input image are processed, where the blocks of input pixels are processed to generate respective non-overlapping blocks of output pixels. For example, when 2× upsampling is implemented, for each input pixel of the input image, a block of input pixels may be processed to generate a 2×2 block of output pixels. The blocks of input pixels may be processed sequentially (in any suitable order). Alternatively, there may be multiple instances of the processing module operating on neighbouring output blocks in parallel. This could be advantageous since it allows for data reuse between output blocks, and allows more output pixels to be generated per clock. For example, a tiled operation may be implemented in which multiple contiguous blocks of output pixels are processed in parallel, e.g. where the multiple blocks of output pixels correspond to a tile of an input image rendered by a tile-based GPU, or a strip of image data. An implementation decision can be made as to whether to process the blocks of input pixels sequentially or in parallel, and in what order or grouping, based on a trade-off between processing speed against silicon area and power consumption. Typically, processing the blocks of input pixels sequentially is slower, but can be implemented with lower power consumption and reduced silicon area, compared to processing the blocks of input pixels in parallel.

In examples in which the blocks of input pixels are processed sequentially, when the block of upsampled pixels 336 has been output then the method can be repeated for the next block of input pixels by striding across the input image with a stride of 1, and by striding across the output by 2 such that a 2× upsampling is achieved. The processing module strides by one pixel position across the input image to get the next block of input pixels, so the next block of input pixels will often largely overlap with the block of input pixels that has just been processed. The pixels may be processed in raster scan order, i.e. in rows from top to bottom and within each row from left to right, or in any other suitable order, e.g. boustrophedon order or Morton order. In other words, for each pixel of the input image we take an input patch (e.g. a 5×5 patch of input pixels) and we output a 2×2 block of upsampled pixels. By doing this across the whole input image, the resolution of the image is doubled, i.e. the number of pixels is multiplied by four.

In the examples described above, three of the four upsampled pixels in the block of upsampled pixels 336 are determined using fixed kernels, e.g. in the same way as they are calculated in a bilinear upsampling technique, but one of the upsampled pixels (the diagonal pixel 332) in the block of upsampled pixels 336 is determined based on the image gradients in the patch. Improving the determination of the diagonal pixel by taking account of image gradients (e.g. caused by edges in the image) greatly reduces the appearance of 'staircasing' artefacts in the upsampled image which tend to occur along diagonal edges in the image (e.g. along edges which are close to 45 degrees to horizontal).

In the examples described above with reference to FIGS. 3*a* and 3*b* the block of input pixels 304 is a 2×2 block of input pixels and the upsampled pixels in the block of upsampled pixels are non-sharpened upsampled pixel values. The upsampled pixels in the block of upsample pixels 336 are described as being "non-sharpened" because no sharpening has been applied either during or after the upsampling process to determine the block of upsampled pixels 336.

Figure 7A:
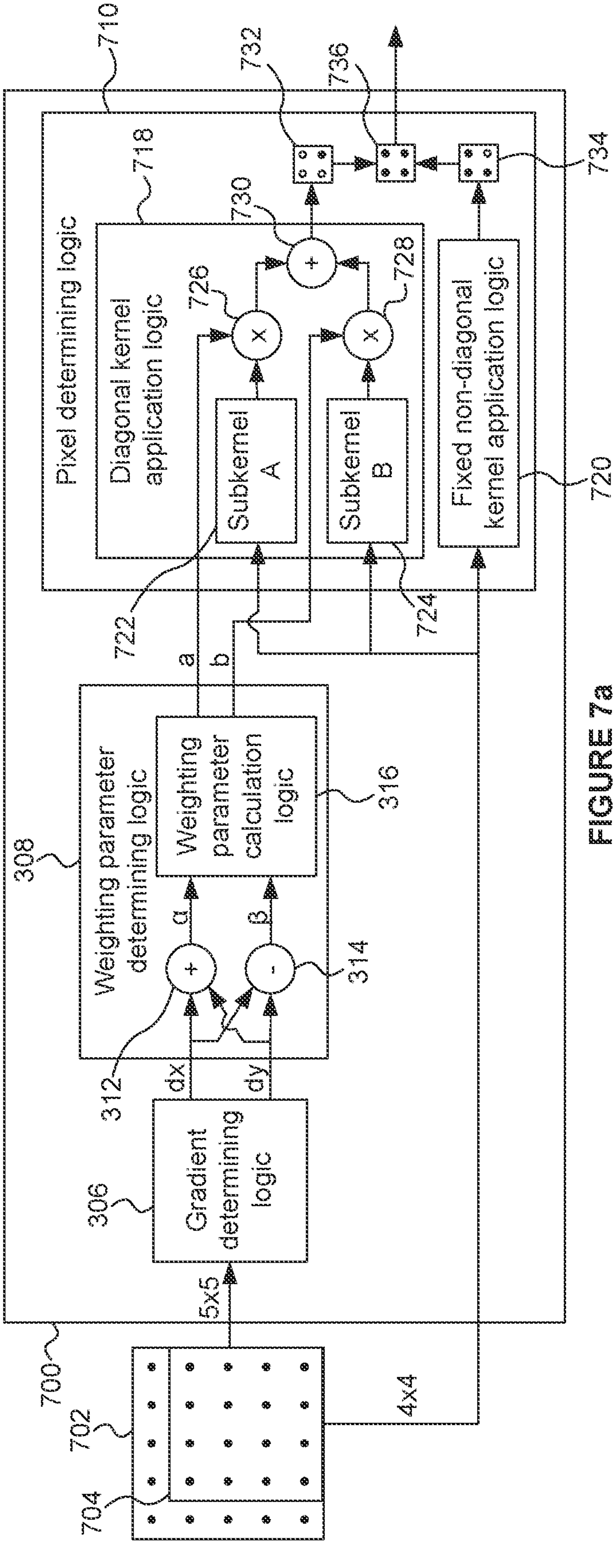
FIG. 7*a* shows a processing module configured to upsample a block of input pixels to determine a block of upsampled pixels according to a second example described herein.

In contrast, FIG. 7*a* shows a processing module 700 configured to upsample a 4×4 block of input pixels 704 to determine a block of upsampled pixels 736 according to a second example, e.g. for use in implementing a super resolution technique. The 4×4 block of input pixels 704 is within a 5×5 patch of input pixels 702 (similar to the patch of input pixels 302 described above). The processing module 700 is configured to upsample the block of input pixels to determine 'sharpened' upsampled pixels in a block of upsampled pixels 736. The upsampled pixels in the block of upsampled pixels 736 are described as being 'sharpened' because sharpening is integrated into the upsampling process to determine the block of upsampled pixels 736. One possibility is to implement the sharpening using an unsharp masking technique (although other sharpening techniques could be used in other examples) and to combine the unsharp masking technique with the upsampling process to determine the block of upsampled pixels 736.

Unsharp masking is a known technique for applying sharpening, and is described here by way of an example method for constructing a sharpening, or combined sharpening and upsampling, kernel or kernels. It will be appreciated that other methods for constructing sharpening kernels are known in the art and can similarly be used here. Conceptually, according to an unsharp masking technique: (i) a blurred version of an input image is determined, e.g. by convolving the image with a Gaussian kernel, wherein the width (i.e. the number of taps) of the Gaussian kernel and the standard deviation (or "variance" or "spread") of the Gaussian function represented by the Gaussian kernel define the amount of blurring that is applied, (ii) the difference between original input image and the blurred image is determined, and (iii) the determined difference is multiplied by some scale factor and added to the original input image to determine the sharpened image. In this way the "unsharp" (i.e. blurred) version of the image is used to create a "mask" for addition to the input image, which is why the sharpening technique is called "unsharp masking". Unsharp masking is an effective way of sharpening an image but it introduces 'overshoot' artefacts around high-contrast edges. Rather than using the three-step process described above for computing an unsharp mask, the same result may be arrived at by a single application of an unsharp mask kernel, K(x), constructed as $(I(x)-G(x;\sigma^2))s+I(x)$, where x is a spatial location, I is the identity kernel (i.e. a kernel with a central "1" surrounded by zeroes), G is the Gaussian kernel from step (i) above which represents a Gaussian function having a variance $\sigma^2$, and s is the scale factor from step (iii) above. Furthermore, this kernel may be convolved with an upsampling kernel (e.g. a bilinear upsampler) to arrive at a kernel that may be used to perform sharpening and upsampling in a single application. Such an isotropic kernel will suffer from the same kind of artefacts as the basic bilinear upsampler (e.g. staircasing), and may be improved using the same approach of an edge-aligned filter for the diagonal pixel. Note that there are two free parameters here, namely the scale factor s and the variance $\sigma^2$ of the Gaussian kernel G, which in some implementations may be exposed as tuneable parameters, and in others (as in the following example) may be "baked into" the choice of fixed weights in the kernels for economy, simplicity, and ease of implementation. The variance, $\sigma^2$, governs the spatial extent of the sharpening effect, and s governs the strength of the sharpening effect. The unsharp mask kernel K, the identity kernel I and the Gaussian kernel G are the same size and shape as each other, e.g. they may each be of size p×p where p is an integer. It will be appreciated that this is one means by which a sharpening kernel may be constructed, and that other means will be apparent to one skilled in the art.

The processing module 700 comprises gradient determining logic 306, weighting parameter determining logic 308 and pixel determining logic 710. The weighting parameter determining logic 308 comprises summation logic 312, subtraction logic 314 and weighting parameter calculation logic 316. The pixel determining logic 710 comprises diagonal kernel application logic 718 and fixed non-diagonal kernel application logic 720. The diagonal kernel application logic 718 comprises first diagonal subkernel application logic 722, second diagonal subkernel application logic 724, first multiplication logic 726, second multiplication logic 728 and summation logic 730. The logic of the processing module 700 may be implemented in hardware, software, or a combination thereof. A hardware implementation normally provides for a reduced latency and power consumption compared to a software implementation. The processing module 700 is likely to be used in the same manner a large number of times on each image being upsampled, and since latency is very important in, for example, real-time super resolution applications, it is likely that implementing the logic of the processing module 700 in hardware (e.g. in fixed function circuitry) will be preferable to implementing the logic in software. However, a software implementation is still possible and may be preferable in some situations.

Figure 4:
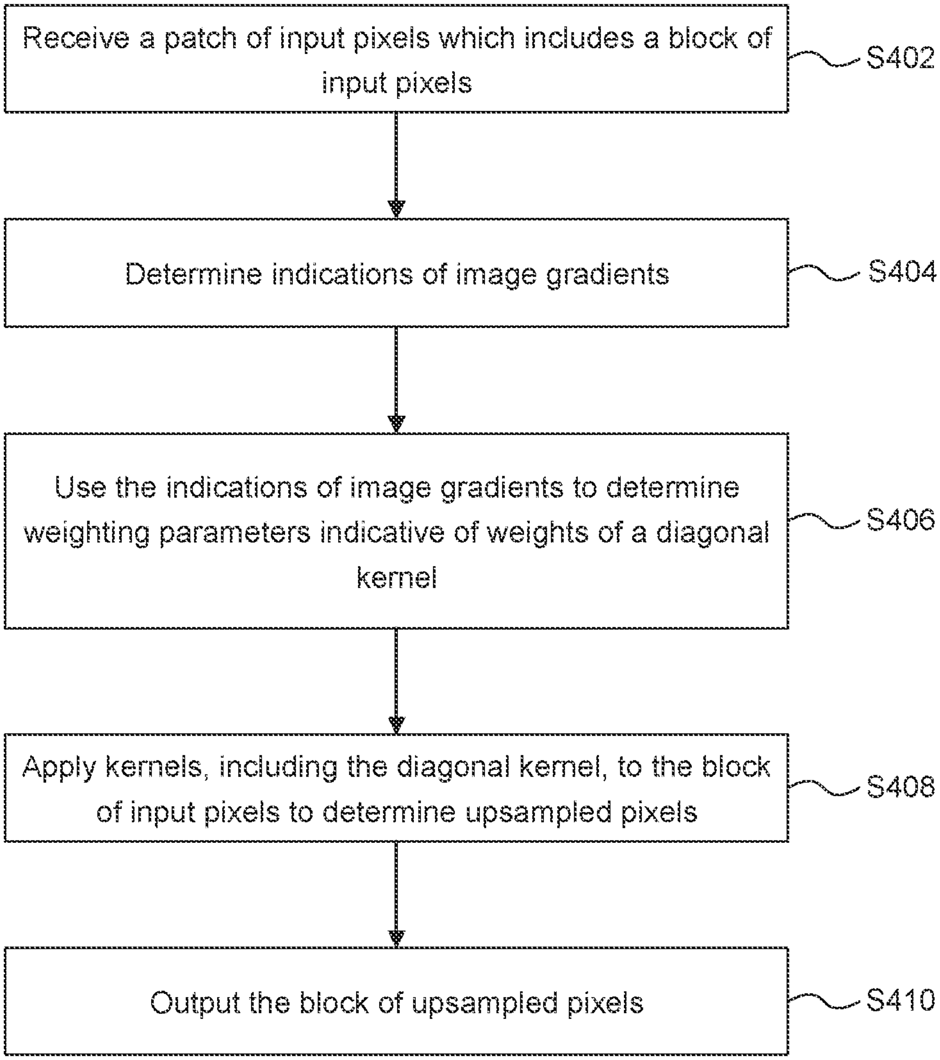
FIG. 4 is a flow chart for a method of upsampling a block of input pixels to determine a block of upsampled pixels.

The method shown in FIG. 4, as described above in relation to the processing module 300, can be implemented using the processing module 700. In particular, the gradient determining logic 306 and weighting parameter determining logic 308 are the same in processing modules 300 and 700, such that steps S402, S404 and S406 are the same when using either of the processing modules 300 and 700.

However, the pixel determining logic 710 has 4×4 kernels which are applied to the 4×4 block of input pixels 704 to determine the 2×2 block of upsampled pixels 736 in a manner in which an unsharp masking technique is applied such that the upsampled pixels are sharpened. In particular, the weights of the three non-diagonal kernels and of the diagonal kernel are configured to apply an unsharp masking technique to the block of input pixels 704. In this way, sharpening and upsampling are combined into a single step, thus avoiding the need for a two-step process.

As an example, if the scale factor s has a value of 1, then the unsharp mask kernel, K, has a plurality of unsharp mask values, wherein the unsharp mask value K(x) at a position, x, relative to the centre of the unsharp mask kernel has a value given by $K(x)=I(x)+(I(x)-G(x;\sigma^2))$, where I(x) is a value at position x within the identity kernel representing the identity function, and where $G(x; \sigma^2)$ is a value at position x within the Gaussian kernel representing a Gaussian function.

Figure 14A:
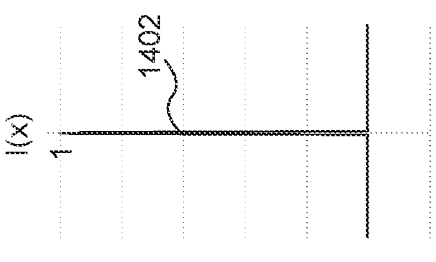
FIG. 14*a* illustrates an identity function for an identity kernel.

FIG. 14*a* illustrates an identity function 1402 for the identity kernel, I. The identity kernel has a value of 1 at the central position and a value of 0 at every other position. The sum of the values of the identity kernel is 1 so the identity kernel is normalised.

Figure 14B:
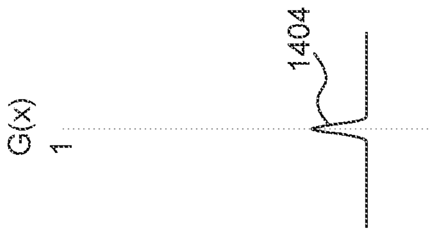
FIG. 14*b* illustrates a spatial Gaussian function for a spatial Gaussian kernel.

FIG. 14*b* illustrates a Gaussian function 1404 for the Gaussian kernel, G. The Gaussian function is of the form $$G(x; \sigma^2) = Ae^{-\frac{x^2}{2\sigma^2}},$$

where $\sigma^2$ is a parameter representing the spatial variance of the Gaussian function, A is a scalar value, and x is a spatial location. As an example, A may be 1. The sum of the values of the Gaussian kernel is 1 so the Gaussian kernel is normalised.

Figure 14C:
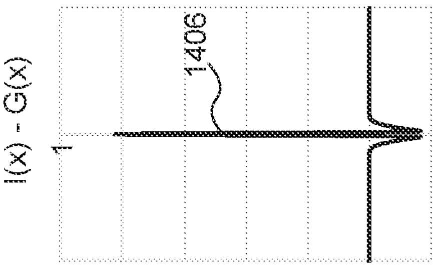
FIG. 14*c* illustrates the difference between the identity function and the spatial Gaussian function for a difference kernel.

FIG. 14*c* illustrates the difference 1406 between the identity function 1402 and the Gaussian function 1404 for a difference kernel, (I−G). Since I and G are both normalised, the sum of the values of the difference kernel is 0.

Figure 14D:
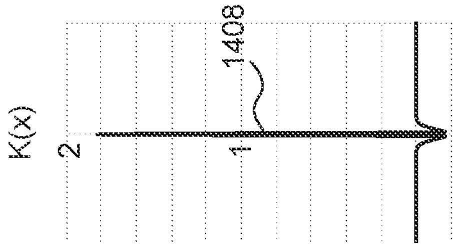
FIG. 14*d* illustrates an unsharp mask function for an unsharp mask kernel.

FIG. 14*d* illustrates an unsharp mask function 1408 for the unsharp mask kernel, K. As described above, K=I+(I−G) in an example in which the scale factor s has a value of 1. Since I and G are both normalised, the sum of the values of the unsharp mask kernel is 1, so the unsharp mask kernel is normalised. The unsharp mask value has a large positive value (e.g. a value above 1) at the central position and has small negative values close to the central position which decrease in magnitude further from the central position.

Figure 14E:
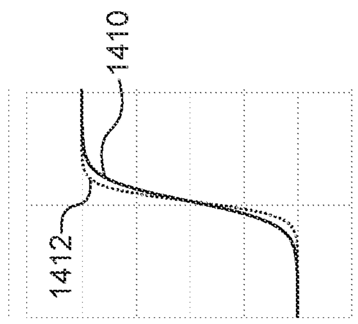
FIG. 14*e* shows a graph illustrating the brightness of an image across an edge in the image, and also illustrating an ideal brightness across a sharper version of the edge.

FIG. 14*e* shows a graph illustrating the brightness 1410 of an image across an edge in the upsampled pixels representing the image. The dotted line 1412 in the graph shown in FIG. 14*e* illustrates an ideal brightness across a sharper version of the edge. In other words, when the edge in the upsampled pixels is sharpened, it would be ideal if the brightness profile could be changed from line 1410 to line 1412.

Figure 14F:
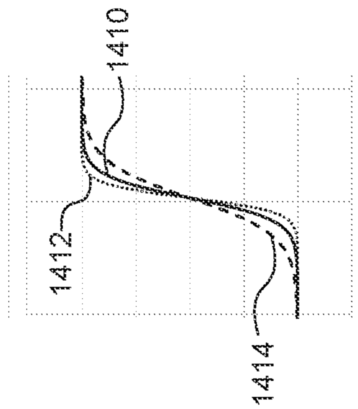
FIG. 14*f* shows the graph of FIG. 5*e* with an additional line to illustrate the brightness across a smoothed version of the edge in the image when the image has been smoothed using the spatial Gaussian kernel.

FIG. 14*f* shows the graph of FIG. 14*e* with an additional dashed line 1414 to illustrate the brightness across a smoothed version of the edge in the image when the upsampled pixels have been smoothed using the Gaussian kernel, G. In other words, if the Gaussian kernel (with the Gaussian function 1404 shown in FIG. 5*b*) was applied to the upsampled pixels, the brightness profile would change from line 1410 to line 1414. It can be seen in FIG. 14*f* that this will blur the edge rather than sharpen it.

Figure 14G:
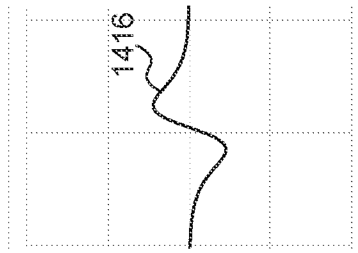
FIG. 14*g* illustrates the result of applying the difference kernel to the edge in the image.

FIG. 14*g* illustrates the result of applying the difference kernel (with the difference function 1406 shown in FIG. 14*c*) to the upsampled pixels representing the edge in the image. In other words, if the difference kernel were applied to the upsampled pixels, the brightness profile would change from line 1410 to line 1416.

Figure 14H:
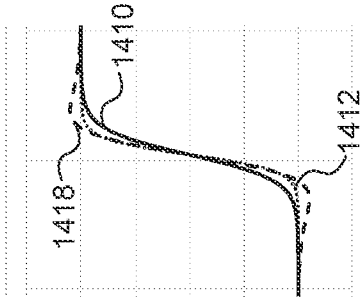
FIG. 14*h* shows the graph of FIG. 5*e* with an additional line to illustrate the brightness across a sharpened version of the edge in the image when the image has been sharpened using the unsharp mask kernel.

FIG. 14*h* shows the graph of FIG. 14*e* with an additional dashed line 1418 to illustrate the brightness across a sharpened version of the edge in the image when the image has been sharpened using the unsharp mask kernel, K. In other words, if the unsharp mask kernel (with the unsharp mask function 1408 shown in FIG. 14*d*) was applied to the upsampled pixels, the brightness profile would change from line 1410 to line 1418. It can be seen in FIG. 14*h* that this will sharpen the edge such that on the edge the line 1418 is very close to the ideal sharpened line 1412. However, it can also be seen that the unsharp mask kernel introduces 'overshoot' near to the edge, which can be seen in FIG. 14*h* where the line 1418 deviates from the ideal line 1412 either side of the edge.

The weights of the kernels can be different in different examples due to different choices of the parameters s and $\sigma^2$, or the use of a different method altogether for constructing the kernels, so that different levels of sharpening can be applied. The kernels are normalised so that the sum of the weights in a kernel is one.

The values of the weights of the kernels can be constructed from an unsharp mask kernel. In particular, weights of five 4×4 kernels may be determined based on two slightly different 7×7 kernels, $K_A$ and $K_B$:

$$K_A = \frac{1}{16}\begin{bmatrix} 0 & -1 & -1 & -1 & -1 & -1 & 0 \\ -1 & -3 & -4 & -5 & -4 & -3 & -1 \\ -1 & -4 & 16 & 19 & -4 & -4 & -1 \\ -1 & -5 & 19 & 48 & 19 & -5 & -1 \\ -1 & -4 & -4 & 19 & 16 & -4 & -1 \\ -1 & -3 & -4 & -5 & -4 & -3 & -1 \\ 0 & -1 & -1 & -1 & -1 & -1 & 0 \end{bmatrix} \text{ and}$$

$$K_B = \frac{1}{16}\begin{bmatrix} 0 & -1 & -1 & -1 & -1 & -1 & 0 \\ -1 & -3 & -4 & -5 & -4 & -3 & -1 \\ -1 & -4 & -4 & 19 & 16 & -4 & -1 \\ -1 & -5 & 19 & 48 & 19 & -5 & -1 \\ -1 & -4 & 16 & 19 & -4 & -4 & -1 \\ -1 & -3 & -4 & -5 & -4 & -3 & -1 \\ 0 & -1 & -1 & -1 & -1 & -1 & 0 \end{bmatrix}.$$

These two large kernels, $K_A$ and $K_B$, are the same as each other, except for four of the values in the central 3×3 region of the kernels. The values that are the same in the two kernels, $K_A$ and $K_B$, come from convolving a bilinear kernel with the unsharp mask to give a 7×7 kernel:

$$\frac{1}{16}\begin{bmatrix} 0 & -1 & -1 & -1 & -1 & -1 & 0 \\ -1 & -3 & -4 & -5 & -4 & -3 & -1 \\ -1 & -4 & 12 & 19 & 12 & -4 & -1 \\ -1 & -5 & 19 & 48 & 19 & -5 & -1 \\ -1 & -4 & 12 & 19 & 12 & -4 & -1 \\ -1 & -3 & -4 & -5 & -4 & -3 & -1 \\ 0 & -1 & -1 & -1 & -1 & -1 & 0 \end{bmatrix}$$

The values that are different in the two kernels, $K_A$ and $K_B$, are found by convolving the unsharp mask with the following modified bilinear upsampling kernels, $K_C$ and $K_D$:

$$K_C = \begin{bmatrix} \frac{1}{2} & \frac{1}{2} & 0 \\ \frac{1}{2} & 1 & \frac{1}{2} \\ 0 & \frac{1}{2} & \frac{1}{2} \end{bmatrix} \text{ and } K_D = \begin{bmatrix} 0 & \frac{1}{2} & \frac{1}{2} \\ \frac{1}{2} & 1 & \frac{1}{2} \\ \frac{1}{2} & \frac{1}{2} & 0 \end{bmatrix}.$$

The two large kernels, $K_A$ and $K_B$, can be padded up to be 8×8 kernels ($K_{A,8\times8}$ and $K_{B,8\times8}$) by adding a rightmost column of zeros and by adding a bottom row of zeros, such that:

$$K_{A,8\times8}=\frac{1}{16}\begin{bmatrix}0&-1&-1&-1&-1&-1&0&0\\-1&-3&-4&-5&-4&-3&-1&0\\-1&-4&16&19&-4&-4&-1&0\\-1&-5&19&48&19&-5&-1&0\\-1&-4&-4&19&16&-4&-1&0\\-1&-3&-4&-5&-4&-3&-1&0\\0&-1&-1&-1&-1&-1&0&0\\0&0&0&0&0&0&0&0\end{bmatrix}\text{ and}$$

$$K_{B,8\times8}=\frac{1}{16}\begin{bmatrix}0&-1&-1&-1&-1&-1&0&0\\-1&-3&-4&-5&-4&-3&-1&0\\-1&-4&-4&19&16&-4&-1&0\\-1&-5&19&48&19&-5&-1&0\\-1&-4&16&19&-4&-4&-1&0\\-1&-3&-4&-5&-4&-3&-1&0\\0&-1&-1&-1&-1&-1&0&0\\0&0&0&0&0&0&0&0\end{bmatrix}.$$

The kernels $K_{A,8\times8}$ and $K_{B,8\times8}$ can then be deinterleaved to determine the weights of the three non-diagonal kernels and to determine weights of two diagonal sub-kernels. For example, if we consider the rows and columns of the kernels $K_{A,8\times8}$ and $K_{B,8\times8}$ to be numbered from 1 to 8 then the deinterleaving: (i) puts the values which are in even-numbered rows and even-numbered columns of the kernels (which are the same in $K_{A,8\times8}$ and $K_{B,8\times8}$) into a first non-diagonal kernel; (ii) puts the values which are in even-numbered rows and odd-numbered columns of the kernels (which are the same in $K_{A,8\times8}$ and $K_{B,8\times8}$) into a second non-diagonal kernel; (iii) puts the values which are in odd-numbered rows and even-numbered columns of the kernels (which are the same in $K_{A,8\times8}$ and $K_{B,8\times8}$) into a third non-diagonal kernel; (iv) puts the values which are in odd-numbered rows and odd-numbered columns of the $K_{A,8\times8}$ kernel into a first diagonal sub-kernel; and (v) puts the values which are in odd-numbered rows and odd-numbered columns of the $K_{B,8\times8}$ kernel into a second diagonal sub-kernel. This is described in more detail below.

In accordance with the description above and what is shown in FIG. 14*d*, the first non-diagonal kernel, which is applied to the 4×4 block of input pixels 704 by the fixed non-diagonal kernel application logic 720 to determine the top left upsampled pixel in the block of upsampled pixels 736, is a 4×4 kernel which has a large positive value (e.g. a value greater than 1) for the weight in the second row of the second column, and has small negative values (e.g. values between −0.5 and 0) for the weights that are adjacent (horizontally, vertically and diagonally) to the weight in the second row of the second column. Weights that are not adjacent (horizontally, vertically or diagonally) to the weight in the second row of the second column have very small magnitudes, e.g. they may be zero. The exact values of the first non-diagonal kernel may be different in different examples and may depend on the choice of the parameters s and $\sigma^2$. As an example, the first non-diagonal kernel, which is applied to the 4×4 block of input pixels by the fixed non-diagonal kernel application logic 720 to determine the top left upsampled pixel in the block of upsampled pixels 736 may be $$\frac{1}{16}\begin{bmatrix}-3&-5&-3&0\\-5&48&-5&0\\-3&-5&-3&0\\0&0&0&0\end{bmatrix}.$$

This corresponds to the decomposition of the kernels $K_{A,8\times8}$ and $K_{B,8\times8}$ described above. It is noted that the first non-diagonal kernel in this example is normalised because its weights sum to one.

In accordance with the description above and what is shown in FIG. 14*d*, the second non-diagonal kernel, which is applied to the 4×4 block of input pixels 704 by the fixed non-diagonal kernel application logic 720 to determine the top right upsampled pixel in the block of upsampled pixels 736 is a 4×4 kernel which has a large positive value (e.g. a value greater than 0.5) for the weights in the second row of the second and third columns, and has small negative values (e.g. values between −0.5 and 0) for the other weights that are adjacent (horizontally, vertically and diagonally) to the weights in the second row of the second and third columns. Weights that are not adjacent (horizontally, vertically or diagonally) to the weights in the second row of either the second or third column have very small magnitudes, e.g. they may be zero. The exact values of the second non-diagonal kernel may be different in different examples and may depend on the choice of the parameters s and $\sigma^2$. As an example, the second non-diagonal kernel, which is applied to the 4×4 block of input pixels by the fixed non-diagonal kernel application logic 720 to determine the top right upsampled pixel in the block of upsampled pixels 736 may be $$\frac{1}{16}\begin{bmatrix}-1&-4&-4&-1\\-1&19&19&-1\\-1&-4&-4&-1\\0&0&0&0\end{bmatrix}.$$

This corresponds to the decomposition of the kernels $K_{A,8\times8}$ and $K_{B,8\times8}$ described above. It is noted that the second non-diagonal kernel in this example is normalised because its weights sum to one.

In accordance with the description above and what is shown in FIG. 14*d*, the third non-diagonal kernel, which is applied to the 4×4 block of input pixels 704 by the fixed non-diagonal kernel application logic 720 to determine the bottom left upsampled pixel in the block of upsampled pixels 736 is a 4×4 kernel which has a large positive value (e.g. a value greater than 0.5) for the weights in the second and third rows of the second column, and has small negative values (e.g. values between −0.5 and 0) for the other weights that are adjacent (horizontally, vertically and diagonally) to the weights in the second and third rows of the second column. Weights that are not adjacent (horizontally, vertically or diagonally) to the weights in either the second or third row of the second column have very small magnitudes, e.g. they may be zero. The exact values of the third non-diagonal kernel may be different in different examples and may depend on the choice of the parameters s and $\sigma^2$. As an example, the third non-diagonal kernel, which is applied to the 4×4 block of input pixels by the fixed non-diagonal kernel application logic 720 to determine the bottom left upsampled pixel in the block of upsampled pixels 736 may be $$\frac{1}{16}\begin{bmatrix}-1&-1&-1&0\\-4&19&-4&0\\-4&19&-4&0\\-1&-1&-1&0\end{bmatrix}.$$

This corresponds to the decomposition of the kernels $K_{A,8\times8}$ and $K_{B,8\times8}$ described above. It is noted that the third non-diagonal kernel in this example is normalised because its weights sum to one.

In the example shown in FIG. 7*a*, the diagonal kernel is applied to the 4×4 block of input pixels 704 by the diagonal kernel application logic 718 to determine the bottom right upsampled pixel in the block of upsampled pixels 736 by applying two 4×4 subkernels and performing a weighted sum of their results using the weighting parameters a and b. In particular, in accordance with the description above and what is shown in FIG. 14*d*, the first diagonal subkernel application logic 722 applies a first 4×4 diagonal subkernel that has a large positive value (e.g. a value greater than 0.5) for the weights in the second row of the second column and in the third row of the third column, and has small negative values (e.g. values between −0.5 and 0) for the other weights that are adjacent (horizontally, vertically and diagonally) to the weights in the second row of the second column and in the third row of the third column. Weights that are not adjacent (horizontally, vertically or diagonally) to the weights in either the second row of the second column or in the third row of the third column have very small magnitudes, e.g. they may be zero. The exact values of the first diagonal subkernel may be different in different examples and may depend on the choice of the parameters s and $\sigma^2$. As a first example, the first diagonal subkernel, which is applied to the 4×4 block of input pixels by the first diagonal subkernel application logic 722 may be $$\frac{1}{16}\begin{bmatrix} -1 & -1 & -1 & 0 \\ -1 & 17 & -4 & -1 \\ -1 & -4 & 17 & -1 \\ 0 & -1 & -1 & -1 \end{bmatrix}.$$

As a second example, the first diagonal subkernel, which is applied to the 4×4 block of input pixels by the first diagonal subkernel application logic 722 may be $$\frac{1}{16}\begin{bmatrix} 0 & -1 & -1 & 0 \\ -1 & 16 & -4 & -1 \\ -1 & -4 & 16 & -1 \\ 0 & -1 & -1 & 0 \end{bmatrix}.$$

This second example corresponds to the decomposition of the kernel $K_{A,8\times8}$ described above. It is noted that the first diagonal subkernels in the first and second examples are normalised because their weights each sum to one. Furthermore, the first diagonal subkernels in the first and second examples are rotationally symmetric with an order of rotational symmetry of two. The output of the first diagonal subkernel application logic 722 is multiplied by the weighting parameter, a, by the first multiplication logic 726.

In accordance with the description above and what is shown in FIG. 14*d*, the second diagonal subkernel application logic 724 applies a second 4×4 diagonal subkernel that has a large positive value (e.g. a value greater than 0.5) for the weights in the third row of the second column and in the second row of the third column, and has small negative values (e.g. values between −0.5 and 0) for the other weights that are adjacent (horizontally, vertically and diagonally) to the weights in the third row of the second column and in the second row of the third column. Weights that are not adjacent (horizontally, vertically or diagonally) to the weights in either the third row of the second column or in the second row of the third column have very small magnitudes, e.g. they may be zero. The exact values of the second diagonal subkernel may be different in different examples and may depend on the choice of the parameters s and $\sigma^2$. As a first example, the second diagonal subkernel, which is applied to the 4×4 block of input pixels by the second diagonal subkernel application logic 724 may be $$\frac{1}{16}\begin{bmatrix} 0 & -1 & -1 & -1 \\ -1 & -4 & 17 & -1 \\ -1 & 17 & -4 & -1 \\ -1 & -1 & -1 & 0 \end{bmatrix}.$$

As a second example, the second diagonal subkernel, which is applied to the 4×4 block of input pixels by the second diagonal subkernel application logic 724 may be $$\frac{1}{16}\begin{bmatrix} 0 & -1 & -1 & 0 \\ -1 & -4 & 16 & -1 \\ -1 & 16 & -4 & -1 \\ 0 & -1 & -1 & 0 \end{bmatrix}.$$

This second example corresponds to the decomposition of the kernel $K_{B,8\times8}$ described above. It is noted that the second diagonal subkernels in the first and second examples are normalised because their weights sum to one. Furthermore, the second diagonal subkernels in the first and second examples are rotationally symmetric with an order of rotational symmetry of two. The output of the second diagonal subkernel application logic 724 is multiplied by the weighting parameter, b, by the second multiplication logic 728.

The summation logic 730 sums the outputs from the first multiplication logic 726 and the second multiplication logic 728 to determine the diagonal pixel 732 which is included in the block of upsampled pixels 736.

The negative weights in the kernels described result from the implementation of the unsharp masking technique, i.e. it is the negative weights that represent the subtraction of a blurred version of the block of input pixels when determining the upsampled pixels.

Figure 7B:
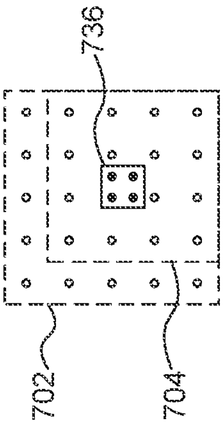
FIG. 7*b* illustrates how the block of upsampled pixels determined by the processing module in FIG. 7*a* relates to the block of input pixels.

FIG. 7*b* illustrates how the block of upsampled pixels 736 relates to the block of input pixels 704 within the patch of input pixels 702.

When the block of upsampled pixels 736 has been output then the method can be repeated for the next block of input pixels by striding across the input image with a stride of 1, and by striding across the output by 2 such that a 2× upsampling is achieved. In other words, for each pixel of the input image we take an input patch (e.g. a 5×5 patch of input pixels) and we output a 2×2 block of upsampled pixels. By doing this across the whole input image, the resolution of the image is doubled, i.e. the number of pixels is multiplied by four. As described above, the pixels may be processed in raster scan order, i.e. in rows from top to bottom and within each row from left to right, or in any other suitable order, e.g. boustrophedon order or Morton order.

Three of the four upsampled pixels in the block of upsampled pixels 736 are determined using fixed kernels, but one of the upsampled pixels (the diagonal pixel 732) in the block of upsampled pixels 736 is determined based on the image gradients in the image. Improving the determination of the diagonal pixel by taking account of image gradients (e.g. caused by edges in the image) greatly reduces the appearance of 'staircasing' artefacts in the upsampled image which tend to occur along diagonal edges in the image (e.g. along edges which are close to 45 degrees to horizontal).

In the examples described above, the gradient determining logic 306 determines indications of image gradients (dx and dy) which indicate image gradients in horizontal and vertical directions respectively. As another example, the gradient determining logic 306 could determine image gradients in diagonal directions instead of in horizontal and vertical directions. For example, the first direction in which an image gradient is calculated could be a first diagonal direction (e.g. along a line for which x=y) and the first indication of an image gradient could correspond to a first intermediate value, α, and indicate a first diagonal image gradient in the patch of input pixels. For example, the first gradient kernel which is applied to the patch of input pixels 302 or 702 may be $$\begin{bmatrix} 0 & -1 & -1 & -1 & 0 \\ -1 & -2 & -1 & 0 & 1 \\ -1 & -1 & 0 & 1 & 1 \\ -1 & 0 & 1 & 2 & 1 \\ 0 & 1 & 1 & 1 & 0 \end{bmatrix}.$$

As described above, "applying" a kernel to the patch of input pixels 302 or 702 means that a weighted sum of the input pixels in the patch 302 or 702 is performed using the kernel values as weights of the weighted sum. So applying the first gradient kernel given above to the patch of input pixels 302 or 702 will directly output a scalar value, α, which indicates an image gradient in a direction along a line for which x=y (diagonally down and to the right in this example), without the need for summation logic 312. The scalar value, α, is passed from the gradient determining logic 306 to the weighting parameter calculation logic 316. It is noted that α may be positive, zero or negative. In other examples, the first gradient kernel could be defined to be the negative of the kernel given above, such that the resulting scalar indication of an image gradient would indicate an image gradient diagonally up and to the left in this example.

In this example, the second direction in which an image gradient is calculated could be a second diagonal direction (e.g. along a line for which x=−y) and the second indication of an image gradient could correspond to a second intermediate value, β, and indicate a second diagonal image gradient in the patch of input pixels. For example, the second gradient kernel which is applied to the patch of input pixels 302 or 702 may be $$\begin{bmatrix} 0 & 1 & 1 & 1 & 0 \\ -1 & 0 & 1 & 2 & 1 \\ -1 & -1 & 0 & 1 & 1 \\ -1 & -2 & -1 & 0 & 1 \\ 0 & -1 & -1 & -1 & 0 \end{bmatrix}.$$

As described above, "applying" a kernel to the patch of input pixels 302 or 702 means that a weighted sum of the input pixels in the patch 302 or 702 is performed using the kernel values as weights of the weighted sum. So applying the second gradient kernel given above to the patch of input pixels 302 or 702 will directly output a scalar value, β, which indicates an image gradient in a direction along a line for which x=−y (diagonally up and to the right in this example), without the need for subtraction logic 314. The scalar value, β, is passed from the gradient determining logic 306 to the weighting parameter calculation logic 316. It is noted that β may be positive, zero or negative. In other examples, the second gradient kernel could be defined to be the negative of the kernel given above, such that the resulting scalar indication of an image gradient would indicate an image gradient diagonally down and to the left in this example. The weighting parameter calculation logic 316 uses the α and β values as described above to calculate the weighting parameters a and b.

By using the diagonal gradient kernels given above the summation logic 312 and the subtraction logic 314 are not needed in the weighting parameter determining logic 308, but the application of the diagonal gradient kernels to the patch of input pixels 302 or 702 is slightly more complex than the application of the horizontal and vertical gradient kernels described above because there are fewer zeros and there are values of 2 and −2 in the diagonal gradient kernels. It is an implementation choice whether to use the horizontal and vertical gradient kernels or the diagonal gradient kernels in the gradient determining logic 306.

Adaptive Sharpening

The sharpening applied by using an unsharp masking technique in the processing module 700 as described above is not 'adaptive' sharpening because it is the same for each block of input pixels. Sharpening is described as "adaptive" if the strength of it can be modified (modulated) for different blocks of input pixels, e.g. based on the input pixels in the block of input pixels. For example, as described below, the sharpening applied to a block of input pixels for which upsampling is performed could be based on a measure of contrast for the block of input pixels. For example, output pixels may be sharpened to a greater extent in low contrast areas, and to a lesser extent in high contrast areas. This can help to reduce overshoot artefacts which are particularly noticeable when sharpening is applied to high-contrast image regions, whilst increasing apparent detail in low-contrast image regions by allowing low-contrast image regions to be sharpened to a greater extent.

Figure 8:
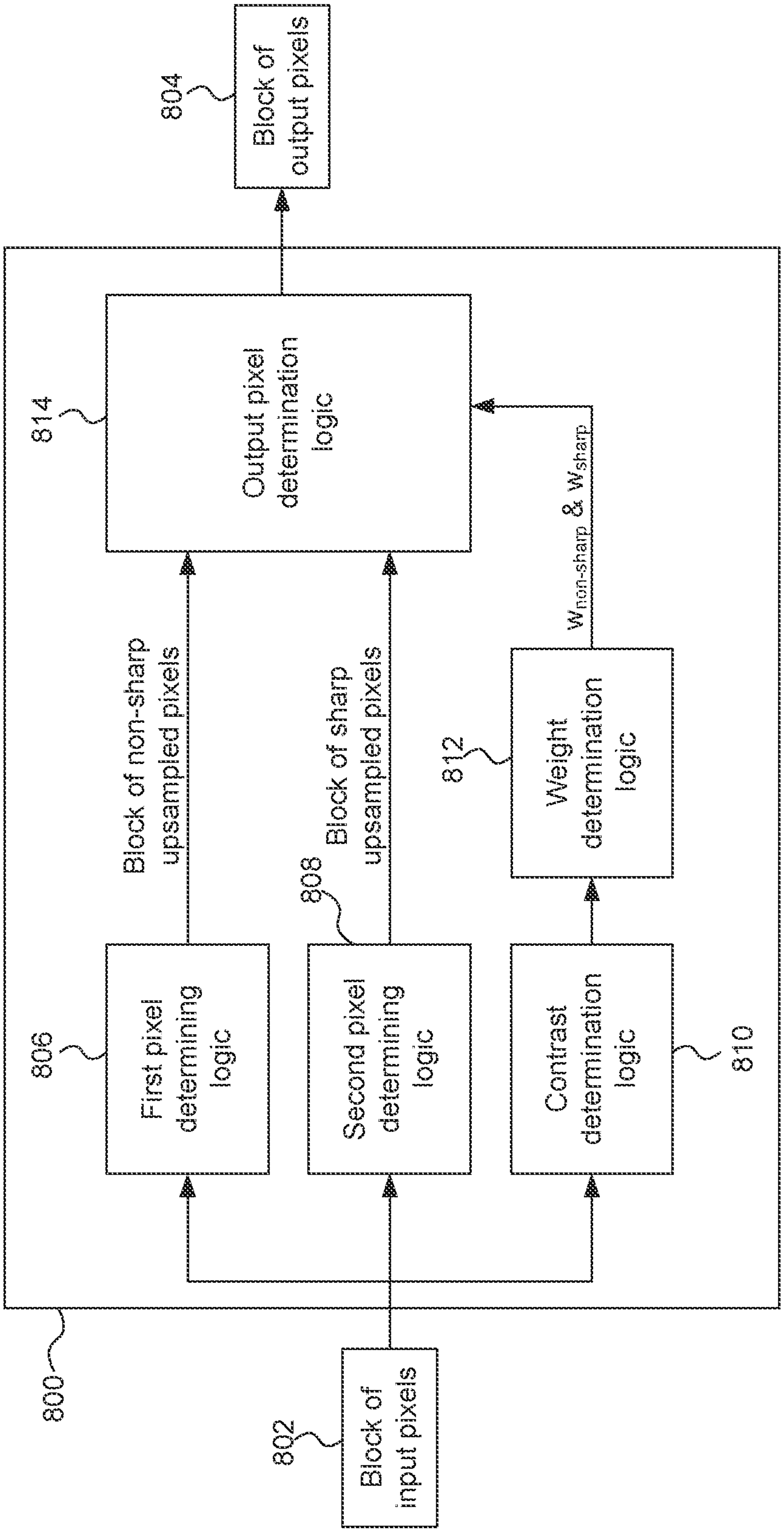
FIG. 8 shows a processing module configured to apply adaptive sharpening, for a block of input pixels for which upsampling is performed, to determine a block of output pixels.

FIG. 8 shows a processing module 800 configured to apply adaptive sharpening, for a block of input pixels 802 for which upsampling is performed, to determine a block of output pixels 804, e.g. for use in implementing a super resolution technique. The processing module 800 comprises first pixel determining logic 806, second pixel determining logic 808, contrast determination logic 810, weight determination logic 812 and output pixel determination logic 814. The logic of the processing module 800 may be implemented in hardware, software or a combination thereof. A hardware implementation normally provides for a reduced latency compared to a software implementation, at the cost of inflexibility of operation. The processing module 800 is likely to be used in the same manner a large number of times on each image being upsampled, and since latency is very important in, for example, real-time super resolution applications, it is likely that implementing the logic of the processing module 800 in hardware (e.g. in fixed function circuitry) will be preferable to implementing the logic in software. However, a software implementation is still possible and may be preferable in some situations.

A method of using the processing module 800 to apply adaptive sharpening, for a block of input pixels 802 for which upsampling is performed, to determine a block of output pixels 804, e.g. for use in implementing a super resolution technique, is described with reference to the flow chart of FIG. 9.

In step S902 the block of input pixels 802 is received at the processing module 800. The block of input pixels 802 may for example be a 2×2 or a 4×4 block of input pixels, but in other examples the shape and/or size of the block of input pixels may be different. The block of input pixels 802 is part of an input image. As described above, as an example, an input image may be an 960×540 image (i.e. an image with 518,400 pixels arranged into 960 columns and 540 rows). The input image may be captured (e.g. by a camera) or may be a computer generated image, e.g. a rendered image of a scene which has been rendered by a GPU using a rendering technique such as rasterization or ray tracing. The block of input pixels 802 is passed to the first pixel determining logic 806, the second pixel determining logic 808 and the contrast determination logic 810.

In step S904 the first pixel determining logic 806 determines a block of non-sharp upsampled pixels based on the block of input pixels 802. The output pixels of the block of output pixels 804 are upsampled pixels (relative to the input pixels of the block of input pixels 802). For example, the block of output pixels may be a 2×2 block of output pixels, but in other examples the block of output pixels could be a different size and/or shape. The block of non-sharp upsampled pixels represents a non-sharp version of the block of output pixels. The block of non-sharp upsampled pixels is passed to, and received by, the output pixel determination logic 814.

The processing module 800 is configured to obtain the block of non-sharp upsampled pixels by determining the block of non-sharp upsampled pixels using the first pixel determining logic 806. In other examples, the processing module 800 could obtain the block of non-sharp upsampled pixels by receiving the block of non-sharp upsampled pixels which have been determined somewhere other than on the processing module 800.

The first pixel determining logic 806 could determine the block of non-sharp upsampled pixels according to any suitable technique, such as by performing bilinear upsampling on the block of input pixels 802 or using an upsampling technique as described above with reference to the processing module 300 shown in FIG. 3*a*.

In step S906 the second pixel determining logic 808 determines a block of sharp upsampled pixels based on the block of input pixels 802. The block of sharp upsampled pixels represents a sharp version of the block of output pixels. For example, the block of sharp upsampled pixels may be a sharp version of the block of output pixels. The block of sharp upsampled pixels is passed to, and received by, the output pixel determination logic 814.

The processing module 800 is configured to obtain the block of sharp upsampled pixels by determining the block of sharp upsampled pixels using the second pixel determining logic 808. In other examples, the processing module 800 could obtain the block of sharp upsampled pixels by receiving the block of sharp upsampled pixels which have been determined somewhere other than on the processing module 800.

The second pixel determining logic 808 could determine the block of sharp upsampled pixels according to any suitable technique, such as by performing an unsharp masking technique to upsample the block of input pixels 802, e.g. using an upsampling technique as described above with reference to the processing module 700 shown in FIG. 7*a*.

In step S908 the contrast determination logic 810 determines an indication of contrast for the block of input pixels 802. In one example, contrast determination logic 810 may determine indications of contrast for the block of input pixels using a window of input pixels wherein the window of input pixels covers at least a region covered by the block of output pixels. As mentioned above, the pixel values may be pixel values from the Y channel (i.e. the luminance channel). Any suitable indication of contrast could be determined. For example, the contrast determination logic 810 could identify a minimum pixel value and a maximum pixel value within a window of input pixels, wherein the window of input pixels covers at least a region represented by the block of output pixels 804. The contrast determination logic 810 could determine a difference between the identified minimum and maximum pixel values within the window of input pixels, and this determined difference can be used as an indication of contrast for the block of input pixels 802. As another example, the contrast determination logic 810 could determine a standard deviation or a variance of the input pixel values within a window of input pixels, and this determined standard deviation or variance can be used as an indication of contrast for the block of input pixels 802. The 'window of input pixels' may be the same as the block of input pixels 802, or it may be a different size and/or shape. For example, the window of input pixels may be larger than the block of input pixels such that the window of input pixels includes the block of input pixels. As another example, the block of input pixels may be larger than the window of input pixels such that the block of input pixels includes the window of input pixels. Just to give some examples, the block of input pixels could be a 2×2 or a 4×4 block of input pixels and the window of input pixels could be a 3×3, 4×4 or 5×5 window of input pixels.

Steps S904, S906 and S908 could be performed in any order, and two or more of these steps could be performed in parallel.

In step S910 the weight determination logic 812 determines weights of weighted sums that are to be performed by the output pixel determination logic 814 in step S912. The weights are determined based on the determined indication of contrast for the block of input pixels 802. For example, the weight determination logic 812 may determine two weights: $w_{non\text{-}sharp}$ and $w_{sharp}$. The first weight, $w_{non\text{-}sharp}$, is to be used for weighting non-sharp upsampled pixels in weighted sums performed by the output pixel determination logic 814. The second weight, $w_{sharp}$, is to be used for weighting sharp upsampled pixels in weighted sums performed by the output pixel determination logic 814. In examples described herein $w_{non\text{-}sharp}+w_{sharp}=1$. Furthermore, in some examples, both $w_{non\text{-}sharp}$ and $w_{sharp}$ are in a range from 0 to 1. In some examples, it may be desirable to set $w_{sharp}=1$ and $w_{non\text{-}sharp}=0$ such that the output pixels are equal to the sharp upsampled pixels. In some other examples, a sharpness boost may be applied by setting $w_{sharp}$ to be greater than 1. In other words, $w_{sharp}$ may be allowed to go above 1 and $w_{non\text{-}sharp}$ to go below 1, which can be used to achieve a sharpness boost. In these other examples, the weights ($w_{non\text{-}sharp}$ and $w_{sharp}$) are still be constrained to sum to 1. The sharpness boost, μ, could be used as a scale factor to scale the sharp weight ($w_{sharp}$) to determine a boosted sharp weight ($w'_{sharp}$) as $w'_{sharp}=\mu w_{sharp}$. A boosted non-sharp weight ($w'_{non\text{-}sharp}$) can be determined as $w'_{non\text{-}sharp}=1-w'_{sharp}$. The sharpness boost, μ, can be exposed as a tuneable parameter, and may take a value equal to, above or below 1. Setting $\mu>1$ will increase the sharpness of the output pixels, whereas setting $\mu<1$ will attenuate the sharpness of the output pixels. In the case that $\mu>1$, the output pixels may be sharper than the sharp upsampled pixels. Though the output pixels may be sharper than the sharp upsampled pixels, the sharp upsampled pixels may still be considered to be a sharp version of the output pixels as increasing $w_{sharp}$ results in a corresponding increase in the sharpness of the output pixels. This allows the strength of the sharpening (e.g. applied by the unsharp mask) to be controlled after implementation in fixed-function hardware without changing the kernel weights. Setting $\mu=1$ means that the sharpness boost will not affect the sharpness of the output pixels. In the examples described below, $\mu$ is set to be 1. Setting $\mu$ to be negative is possible and would mean that the image is blurred rather than sharpened.

In general, the first weight, $w_{non\text{-}sharp}$, is larger than the second weight, $w_{sharp}$, when the indicated contrast is relatively high (e.g. when the indicated contrast is between 0.5 and 1, if 0 is the minimum possible indicated contrast and 1 is the maximum possible indicated contrast); whereas the first weight, $w_{non\text{-}sharp}$ is smaller than the second weight, $w_{sharp}$, when the indicated contrast is relatively low (e.g. when the indicated contrast is between 0 and 0.5, if 0 is the minimum possible indicated contrast and 1 is the maximum possible indicated contrast). This may be the case over a majority of the range of possible indications of contrast, e.g. it may be the case over the whole range of possible indications of contrast. In this way, for regions with high contrast the block of output pixels will be more similar to the block of non-sharp upsampled pixels than to the block of sharp upsampled pixels (because $w_{non\text{-}sharp}>w_{sharp}$) such that overshoot artefacts caused by sharpening regions of high contrast are reduced; whereas for regions with low contrast the block of output pixels will be more similar to the block of sharp upsampled pixels than to the block of non-sharp upsampled pixels (because $w_{non\text{-}sharp}<w_{sharp}$) such that apparent detail in low contrast regions is enhanced.

In some examples, the weight determination logic 812 may determine whether the indication of contrast is below a threshold indicating that the block of input pixels is substantially flat. If the indication of contrast is below the threshold then the first weight, $w_{non\text{-}sharp}$, can be determined to be greater than zero (e.g. it can be determined to be 1) and the second weight, $w_{sharp}$, is determined to be zero. As an example, the indication of contrast could be scaled to lie in a range from 0 to 1 (where 0 indicates that the block of input pixels is completely flat and 1 indicates a maximum possible contrast for the block of input pixels), and in this example the threshold which indicates that a block of input pixels is substantially flat could be 0.02. If the indication of contrast for the block of input pixels is below the threshold then the block of input pixels can be considered to be flat. For image regions that are considered to be substantially flat (e.g. plain background sky in an image), if the sharp upsampled pixels were to be used as the output pixels then certain artefacts (for example, banding due to quantisation, and block artefacts due to image/video compression) would become much more apparent in smooth regions of the image. Such artefacts can be particularly noticeable in image regions that are substantially flat, and it can be considered better to blur these regions slightly rather than enhance their sharpness. As such, for these substantially flat image regions, the sharp upsampled pixels are not used for determining the output pixels, and instead the output pixels are determined to be the non-sharp upsampled pixels. This is achieved by setting $w_{non\text{-}sharp}=1$ and $w_{sharp}=0$ when the indication of contrast is below the threshold.

In step S912 the output pixel determination logic 814 determines each of the output pixels of the block of output pixels 804 by performing a respective weighted sum (i.e. a weighted sum for each of the output pixels) of: (i) a corresponding non-sharp upsampled pixel in the block of non-sharp upsampled pixels and (ii) a corresponding sharp upsampled pixel in the block of sharp upsampled pixels. The weights of the weighted sums are based on the determined indication of contrast for the block of input pixels. In particular, the weights of the weighted sums corresponding to (i) and (ii) are $w_{non\text{-}sharp}$ and $w_{sharp}$ respectively, which are determined as described above. In the present example $w_{non\text{-}sharp}$ and $w_{sharp}$ are the same for all pixels in the block of output pixels 804, but it will be appreciated that in other examples they may be different, for example by deriving them from measurements of contrast from different regions of the input patch 702. Therefore, in the main examples described herein, there is a single indication of contrast for a block of input pixels, and the weights of the weighted sums for determining the output pixels of the block of output pixels are based on the single indication of contrast; whereas in some other examples, there may be a plurality of indications of contrast for the block of input pixels, wherein for each of the output pixels of the block of output pixels, the weights of the weighted sum for determining that output pixel may be based on a respective one of the plurality of indications of contrast.

For example, the block of non-sharp upsampled pixels determined by the first pixel determining logic 806, the block of sharp upsampled pixels determined by the second pixel determining logic 808, and the block of output pixels 804 may be all be 2×2 blocks. In this case, the top left output pixel of the block of output pixels 804 is determined by summing: (i) the result of multiplying the top left non-sharp upsampled pixel of the block of non-sharp upsampled pixels by the weight $w_{non\text{-}sharp}$ and (ii) the result of multiplying the top left sharp upsampled pixel of the block of sharp upsampled pixels by the weight $w_{sharp}$. The top right output pixel of the block of output pixels 804 is determined by summing: (i) the result of multiplying the top right non-sharp upsampled pixel of the block of non-sharp upsampled pixels by the weight $w_{non\text{-}sharp}$, and (ii) the result of multiplying the top right sharp upsampled pixel of the block of sharp upsampled pixels by the weight $w_{sharp}$. The bottom left output pixel of the block of output pixels 804 is determined by summing: (i) the result of multiplying the bottom left non-sharp upsampled pixel of the block of non-sharp upsampled pixels by the weight $w_{non\text{-}sharp}$, and (ii) the result of multiplying the bottom left sharp upsampled pixel of the block of sharp upsampled pixels by the weight $w_{sharp}$. The bottom right output pixel of the block of output pixels 804 is determined by summing: (i) the result of multiplying the bottom right non-sharp upsampled pixel of the block of non-sharp upsampled pixels by the weight $w_{non\text{-}sharp}$, and (ii) the result of multiplying the bottom right sharp upsampled pixel of the block of sharp upsampled pixels by the weight $w_{sharp}$.

Therefore, the output pixel determination logic 814 blends the non-sharp and sharp upsampled pixels using weighted sums. The weights of the weighted sums are what makes the sharpening "adaptive" because the weights are dependent upon the block of input pixels 802. In particular, the weights are dependent upon a measure of contrast for the block of input pixels 802. Performing weighted sums and just altering the weights of the sums to make the sharpening 'adaptive' is very efficient to implement, e.g. in (low cost) hardware, whilst providing surprisingly beneficial effects. In particular, the processing module 800 which performs the adaptive sharpening technique described with reference to the flow chart of FIG. 9 has very low latency, power consumption and/or silicon area compared to conventional adaptive sharpening techniques. Furthermore, the contrast determination is based on the low resolution input pixels, rather than on the high resolution output pixels, so the contrast determination can take account of a larger region of the image without having to process as many pixels. Furthermore, in the processing module 800 the upsampling and adaptive sharpening is performed for blocks of input pixels in a single pass through the processing module 800, rather than implementing a two-stage process of upsampling the whole input image and then sharpening the whole upsampled image which would require some intermediate storage between the two stages to store the upsampled (but unsharpened) image.

In step S914 the block of output pixels 804 is output from the output pixel determination logic 814, and output from the processing module 800. The output pixels in the block of output pixels have been upsampled and adaptively sharpened. When the block of upsampled pixels 804 has been output then the method can be repeated for the next block of input pixels by striding across the input image with a stride of 1, and by striding the output by 2 such that a 2× upsampling is achieved. In other words, for each pixel of the input image we have a block of input pixels (e.g. a 2×2 or 4×4 block of input pixels) and we output a 2×2 block of upsampled pixels. By doing this across the whole input image, the resolution of the image is doubled, i.e. the number of pixels is multiplied by four, and the upsampled pixels are adaptively sharpened. The pixels may be processed in raster scan order, i.e. in rows from top to bottom and within each row from left to right, or in any other suitable order, e.g. boustrophedon order or Morton order. After the block of output pixels 804 has been output from the processing module 800 it may be used in any suitable manner, e.g. it may be stored in a memory, displayed on a display or transmitted to another device.

Figure 9:
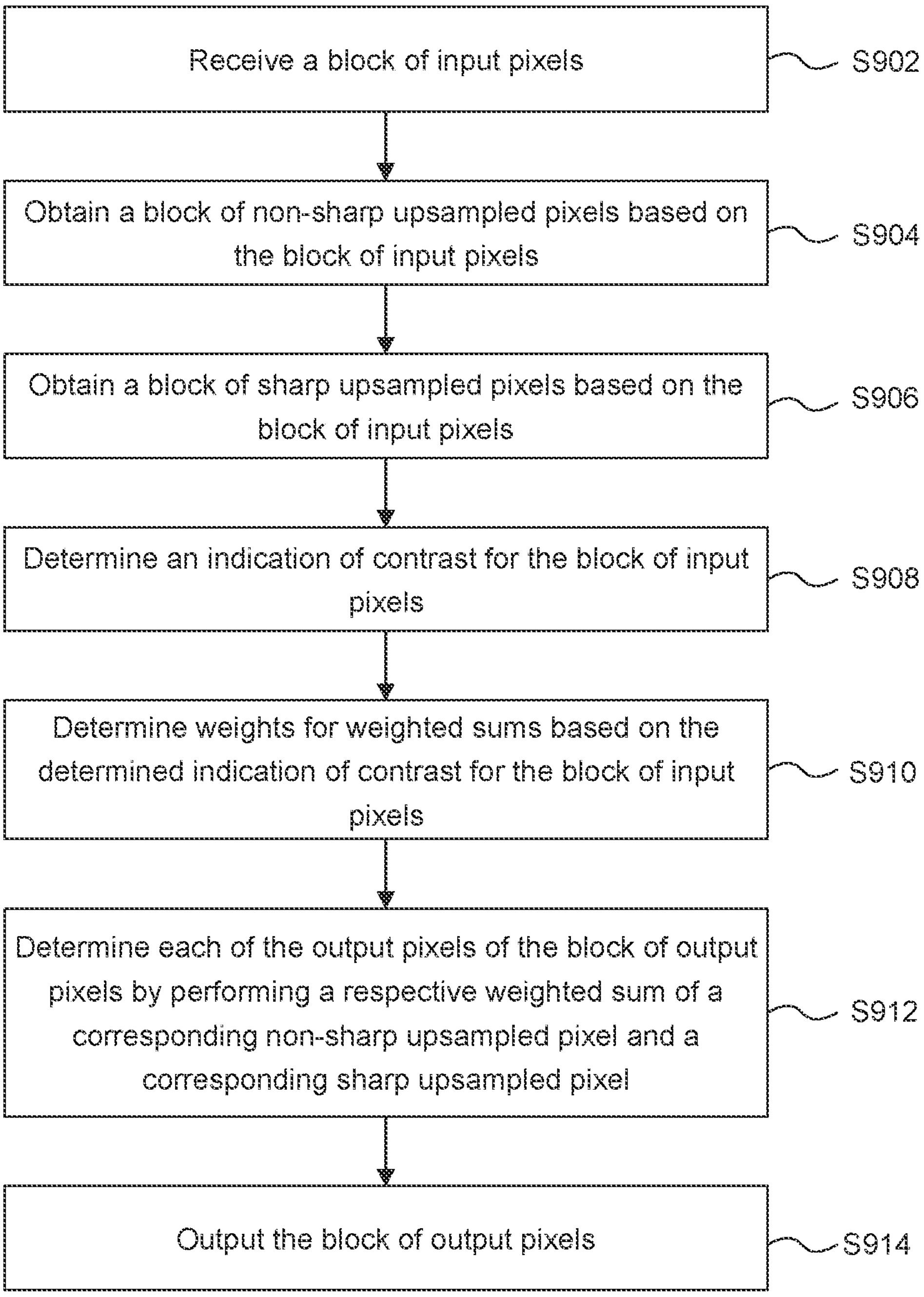
FIG. 9 is a flow chart for a method of applying adaptive sharpening, for a block of input pixels for which upsampling is performed, to determine a block of output pixels.

With reference to FIGS. 8 and 9 examples are described above in which the processing module 800 is used to apply adaptive sharpening, for a block of input pixels 802 for which upsampling is performed, to determine a block of output pixels 804. However, the same principles of applying adaptive sharpening could be used on a block of input pixels, for which processing other than upsampling is performed, to determine a block of output pixels. For example, the adaptive sharpening can be applied to blocks of input pixels of an image to enhance the appearance of the image without necessarily upsampling the image, i.e. without necessarily increasing the resolution of the image.

Furthermore, the adaptive sharpening technique described herein could be implemented on any given image (not necessarily an image that is being processed in some other way). Therefore, in some examples, the adaptive sharpening described herein could be applied to a block of input pixels, wherein a block of sharp pixels can be generated from the block of input pixels and then a weighted sum may be performed of the input pixels and the corresponding sharp pixels to determine the output (sharpened) pixels.

In particular, a processing module may implement a method of applying adaptive sharpening, for a block of input pixels, to determine a block of output pixels in accordance with the adaptive sharpening techniques described herein. A block of sharp pixels can be obtained (e.g. determined) based on the block of input pixels, where the block of sharp pixels is for representing a sharp version of the block of output pixels. For example, the sharp pixels could represent a sharp version of the output pixels. In particular, the block of sharp pixels could represent a sharp version of the input pixels. One or more indications of contrast for the block of input pixels are determined. Then each of the output pixels of the block of output pixels is determined by performing a respective weighted sum (i.e. a weighted sum for each of the output pixels) of: (i) a corresponding input pixel in the block of input pixels and (ii) a corresponding sharp pixel in the block of sharp pixels. The weights of the weighted sums are based on the determined one or more indications of contrast for the block of input pixels. In particular, the weights of the weighted sums corresponding to (i) and (ii) are $w_{input}$ and $w_{sharp}$ respectively, which are determined in a corresponding way to that described herein, for the weights $w_{non\text{-}sharp}$ and $w_{sharp}$ (by considering $w_{input}$ as a weighting factor applied to a block of input pixels in place of $w_{non\text{-}sharp}$ as a weighting factor applied to a block of non-sharp upsampled pixels).

A number of examples of a new upsampling technique have been described with reference to FIGS. 3*a* to 7*b*, and a new adaptive sharpening technique has been described with reference to FIGS. 8 and 9. The new upsampling technique and the new adaptive sharpening technique can be implemented separately as described above. Furthermore, the new upsampling technique and the new adaptive sharpening technique can be implemented together as described below with reference to FIGS. 10*a* and 10*b*.

Figure 10A:
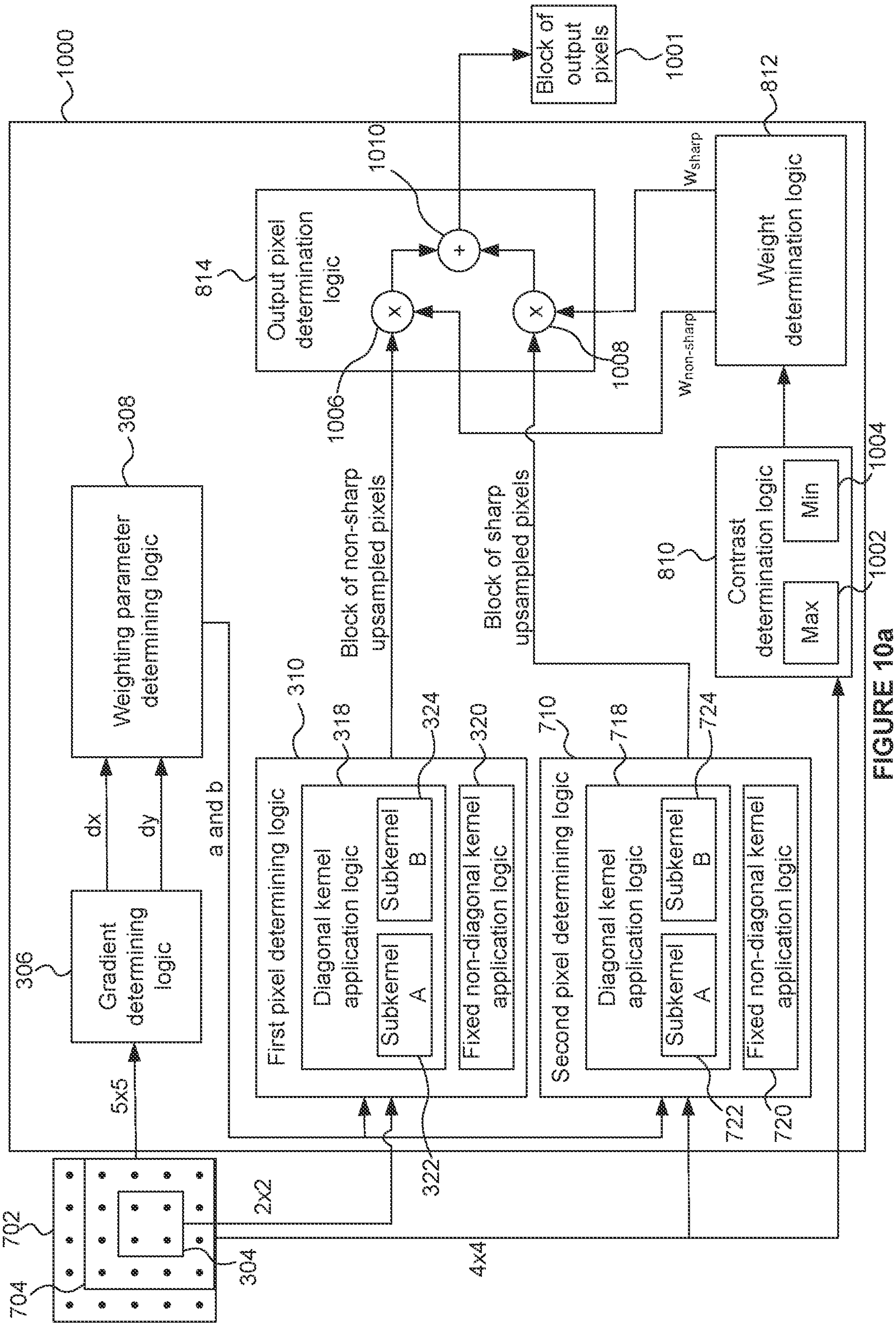
FIG. 10*a* shows a processing module configured to upsample a block of input pixels and apply adaptive sharpening to determine a block of output pixels.
Figure 10B:
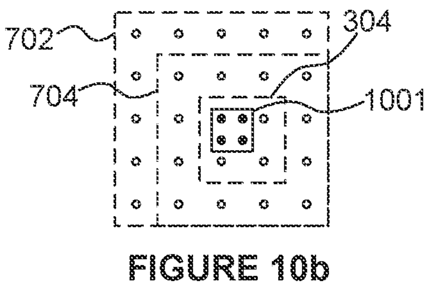
FIG. 10*b* illustrates how the block of output pixels determined by the processing module in FIG. 10*a* relates to the block of input pixels.

In some examples, the gradient and weight determining logic may be shared between the first and second pixel determining logic. FIG. 10*a* shows a processing module 1000 configured to upsample a 4×4 block of input pixels 704 and apply adaptive sharpening to determine a block of output pixels 1001, e.g. for use in implementing a super resolution technique. FIG. 10*b* illustrates how the block of output pixels 1001 determined by the processing module 1000 relates to the block of input pixels 704, and to a 2×2 sub-block of input pixels 304 and a 5×5 patch of input pixels 702.

The processing module 1000 comprises gradient determining logic 306, weighting parameter determining logic 308, first pixel determining logic 310, second pixel determining logic 710, contrast determination logic 810, weight determination logic 812 and output pixel determination logic 814. The gradient determining logic 306, weighting parameter determining logic 308 and first pixel determining logic 310 are the same as the corresponding components (with the same reference numerals) in processing module 300 described above with reference to FIG. 3*a*. In particular, the first pixel determining logic 310 comprises first diagonal kernel application logic 318 and first fixed non-diagonal kernel application logic 320 as described above. The first diagonal kernel application logic 318 comprises first non-sharp diagonal subkernel application logic 322 and second non-sharp diagonal subkernel application logic 324 as described above. The second pixel determining logic 710 comprises second diagonal kernel application logic 718 and second fixed non-diagonal kernel application logic 720 as described above. The second diagonal kernel application logic 718 comprises first sharp diagonal subkernel application logic 722 and second sharp diagonal subkernel application logic 724 as described above.

The processing module 1000 determines a block of non-sharp upsampled pixels as described above in relation to the processing module 300 shown in FIG. 3*a*. In particular, the gradient determining logic 306 determines indications of image gradients (e.g. dx and dy) for the block of input pixels. The weighting parameter determination logic 308 uses the determined indications of image gradients (e.g. dx and dy) to determine one or more weighting parameters (e.g. a and b) which are indicative of weights of a diagonal kernel. The first pixel determining logic 310 determines the non-sharp upsampled pixels of the block of non-sharp upsampled pixels by applying kernels to input pixels of the block of input pixels. In particular, first fixed non-diagonal kernel application logic 320 applies fixed kernels (e.g. as shown in FIGS. 5*c*, 5*d* and 5*e*) to the 2×2 sub-block of input pixels 304 to determine the three non-diagonal non-sharp upsampled pixels of the block of non-sharp upsampled pixels. The first diagonal kernel application logic 318 determines the diagonal non-sharp upsampled pixel of the block of non-sharp upsampled pixels by applying a diagonal kernel to the 2×2 sub-block of input pixels 304 in accordance with the determined one or more weighting parameters. For example, as described above, the first diagonal kernel application logic 318 may use the first non-sharp diagonal sub kernel application logic 322 to apply a first diagonal non-sharp subkernel to the sub-block of input pixels 304. The first diagonal kernel application logic 318 comprises first non-sharp multiplication logic 326 (shown in FIG. 3*a*) which it uses to multiply the result of applying the first non-sharp diagonal subkernel to the sub-block of input pixels 304 by a first of the weighting parameters, a, to determine a first non-sharp diagonal component. The first diagonal kernel application logic 318 may use the second non-sharp diagonal sub kernel application logic 324 to apply a second diagonal non-sharp subkernel to the sub-block of input pixels 304. The first diagonal kernel application logic 318 comprises second non-sharp multiplication logic 328 (shown in FIG. 3*a*) which it uses to multiply the result of applying the second non-sharp diagonal subkernel to the sub-block of input pixels 304 by a second of the weighting parameters, b, to determine a second non-sharp diagonal component. The first diagonal kernel application logic 318 comprises first summation logic 330 (shown in FIG. 3*a*) which it uses to sum the first and second non-sharp diagonal components to determine the non-sharp diagonal pixel in the block of non-sharp upsampled pixels. The block of non-sharp upsampled pixels is provided to the output pixel determination logic 814. In the example shown in FIG. 10*a* and described in detail herein, the same weighting parameters a and b are provided to the first and second pixel determining logic 310 and 710, but in other examples the weighting parameters provided to the first pixel determining logic 310 may be different to the weighting parameters provided to the second pixel determining logic 710.

The processing module 1000 determines a block of sharp upsampled pixels as described above in relation to the processing module 700 shown in FIG. 7*a*. In particular, the second pixel determining logic 710 determines the sharp upsampled pixels of the block of sharp upsampled pixels by applying kernels to input pixels of the block of input pixels. In particular, second fixed non-diagonal kernel application logic 720 applies fixed kernels (e.g. as described above) to the 4×4 block of input pixels 704 to determine the three non-diagonal sharp upsampled pixels of the block of sharp upsampled pixels. The second diagonal kernel application logic 718 determines the diagonal sharp upsampled pixel of the block of sharp upsampled pixels by applying a diagonal kernel to the 4×4 block of input pixels 704 in accordance with the determined one or more weighting parameters (a and b). For example, as described above, the second diagonal kernel application logic 718 may use the first sharp diagonal sub kernel application logic 722 to apply a first diagonal sharp subkernel to the block of input pixels 704. The second diagonal kernel application logic 718 comprises first sharp multiplication logic 726 (shown in FIG. 7*a*) which it uses to multiply the result of applying the first sharp diagonal subkernel to the block of input pixels 704 by a first of the weighting parameters, a, to determine a first sharp diagonal component. The second diagonal kernel application logic 718 may use the second sharp diagonal sub kernel application logic 724 to apply a second diagonal sharp subkernel to the block of input pixels 704. The second diagonal kernel application logic 718 comprises second sharp multiplication logic 728 (shown in FIG. 7*a*) which it uses to multiply the result of applying the second sharp diagonal subkernel to the block of input pixels 704 by a second of the weighting parameters, b, to determine a second sharp diagonal component. The second diagonal kernel application logic 718 comprises second summation logic 730 (shown in FIG. 7*a*) which it uses to sum the first and second sharp diagonal components to determine the sharp diagonal pixel in the block of sharp upsampled pixels. The block of sharp upsampled pixels is provided to the output pixel determination logic 814.

As described above, the weighting parameters, a and b, are determined such that: (i) a weighting parameter indicative of a relatively low weight of the diagonal kernel is determined at a position corresponding to an input pixel on a first diagonal line passing in a first diagonal direction through the diagonal pixel position in response to the determined indications of image gradients, indicating that there is a relatively high image gradient in the first diagonal direction; and (ii) a weighting parameter indicative of a relatively high weight of the diagonal kernel is determined at a position corresponding to an input pixel on a second diagonal line passing in a second diagonal direction through the diagonal pixel position in response to the determined indications of image gradients, indicating that there is a relatively low image gradient in the second diagonal direction.

The contrast determination logic 810 receives the block of input pixels 704 and determines an indication of the contrast for the block of input pixels 704 as described above in relation to the processing module 800. As shown in FIG. 10*a*, the contrast determination logic 810 may comprise: maximum pixel identification logic 1002 configured to identify a maximum pixel value within a window of input pixels, and minimum pixel identification logic 1004 configured to identify a minimum pixel value within a window of input pixels. As described above, the window of input pixels covers at least a region represented by the block of output pixels 1001, and may be smaller than, equal to or larger than the block of input pixels 704. If the window of input pixels is larger than the block of input pixels 704 then the contrast determination logic 810 would receive more input pixels than just the block of input pixels 704. In the example shown in FIG. 10*a*, the contrast determination logic 810 determines a difference between the identified minimum and maximum pixel values within the window of input pixels and uses this as an indication of the contrast for the block of input pixels 704. The indication of contrast for the block of input pixels 704 is provided to the weight determination logic 812.

In some examples, the contrast determination logic 810 may receive the indications of image gradients (for example, dx and dy) determined by the gradient determining logic 306 and may use the indications of image gradients, or derivatives therefrom (such as the magnitude of the edge obtained as $\sqrt{dx^2+dy^2}$), to determine the indication of contrast for the block of input pixels. In this way, the magnitude of the edges ($\sqrt{dx^2+dy^2}$) is used as a proxy for the indication of contrast for the block of input pixels. As another example, the contrast determination logic 810 may receive the weighting parameters (a and b) determined by the weighting parameter determining logic 308 and may use the weighting parameters, or derivatives therefrom (such as a value of $$\left.\frac{1}{2}|a-b|\right),$$

to determine the indication of contrast for the block of input pixels. In this way, the value of $$\frac{1}{2}|a-b|$$

could be used as a proxy for the indication of contrast for the block of input pixels. When a is close or equal to b this is an indication that there are no strong gradients in the block of input pixels and the contrast is low, so if we take the difference we have a good idea of the contrast.

The weight determination logic 812 determines the weights $w_{non\text{-}sharp}$ and $w_{sharp}$ as described above, and provides these weights to the output pixel determination logic 814. In particular, the weight determination logic 812 determines the weights ($w_{non\text{-}sharp}$ and $w_{sharp}$) based on the determined indication of contrast for the block of input pixels.

The output pixel determination logic 814 receives the (e.g. 2×2) block of non-sharp upsampled pixels from the first pixel determining logic 310 and receives the (e.g. 2×2) block of sharp upsampled pixels from the second pixel determining logic 710. The output pixel determination logic 814 determines each of the output pixels of the (e.g. 2×2) block of output pixels by performing a respective weighted sum of: (i) a corresponding non-sharp upsampled pixel in the block of non-sharp upsampled pixels and (ii) a corresponding sharp upsampled pixel in the block of sharp upsampled pixels, wherein the weights of the weighted sums ($w_{non\text{-}sharp}$ and $w_{sharp}$) are based on the determined indication of contrast for the block of input pixels. For example, the output pixel determination logic 814 comprises multiplication logic 1006 which it uses to multiply the non-sharp upsampled pixels of the block of non-sharp upsampled pixels by the $w_{non\text{-}sharp}$ weight. The output pixel determination logic 814 also comprises multiplication logic 1008 which it uses to multiply the sharp upsampled pixels of the block of sharp upsampled pixels by the $w_{sharp}$ weight. The output pixel determination logic 814 also comprises summation logic 1010 which it uses to sum the output from the multiplication logic 1006 with the output from the multiplication logic 1008 to thereby determine the output pixels of the block of output pixels 1001.

As described above, the block of output pixels 1001 is output from the output pixel determination logic 814, and output from the processing module 1000. The output pixels in the block of output pixels have been upsampled and adaptively sharpened. When the block of upsampled pixels 1001 has been output then the method can be repeated for the next block of input pixels by striding across the input image with a stride of 1, and by striding the output by 2 such that a 2× upsampling is achieved. In other words, for each pixel of the input image we take a block of input pixels and we output a 2×2 block of upsampled pixels. By doing this across the whole input image, the resolution of the image is doubled, i.e. the number of pixels is multiplied by four, and the upsampled pixels are adaptively sharpened. After the block of output pixels 1001 has been output from the processing module 1000 it may be used in any suitable manner, e.g. it may be stored in a memory, displayed on a display or transmitted to another device.

Figure 11:
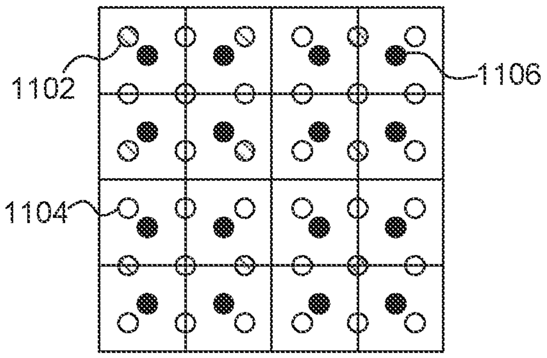
FIG. 11 illustrates a downscaling of the upsampled pixels by a factor of 1.5.

In the examples described above, the upsampling is 2× upsampling, i.e. the number of pixels is doubled in each dimension of the 2D image. In some situations a different upsampling (or "upscaling") factor may be desired, and in other examples, other upsampling factors may be implemented. For example, an upsampling factor of 1.33

$$\left(\text{i.e. } \frac{4}{3}\right)$$

may be desired. In order to implement 1.33× upsampling, a 2× upsampling process can be performed as described above and then a downsampling (or "downscaling") process can be performed with a downsampling ratio of 1.5. FIG. 11 illustrates a downscaling of the upsampled pixels by a factor of 1.5. Downscaling by a factor of 1.5 can be thought of as producing a 2×2 output from a 3×3 input. In FIG. 11, the original input pixels are shown as circles with diagonal hatching 1102, the 2× upsampled pixels are shown as hollow circles 1104 (where it is noted that a 2× upsampled pixel will be at each of the original input pixel positions), and the subsequently downscaled pixels (i.e. the 1.33× upsampled pixels) are shown as solid circles 1106. The downscaling could be performed using any suitable downscaling process, e.g. bilinear interpolation, which is a known process. In systems which implement upsampling and adaptive sharpening, the downscaling could be performed after the upsampling and adaptive sharpening, i.e. on the output pixels in the block of output pixels (804 or 1001). Alternatively, the downscaling could be performed after the upsampling but before the adaptive sharpening, i.e. on the block of non-sharp upsampled pixels and on the block of sharp upsampled pixels before they are input to the output pixel determination logic 814.

Figure 15:
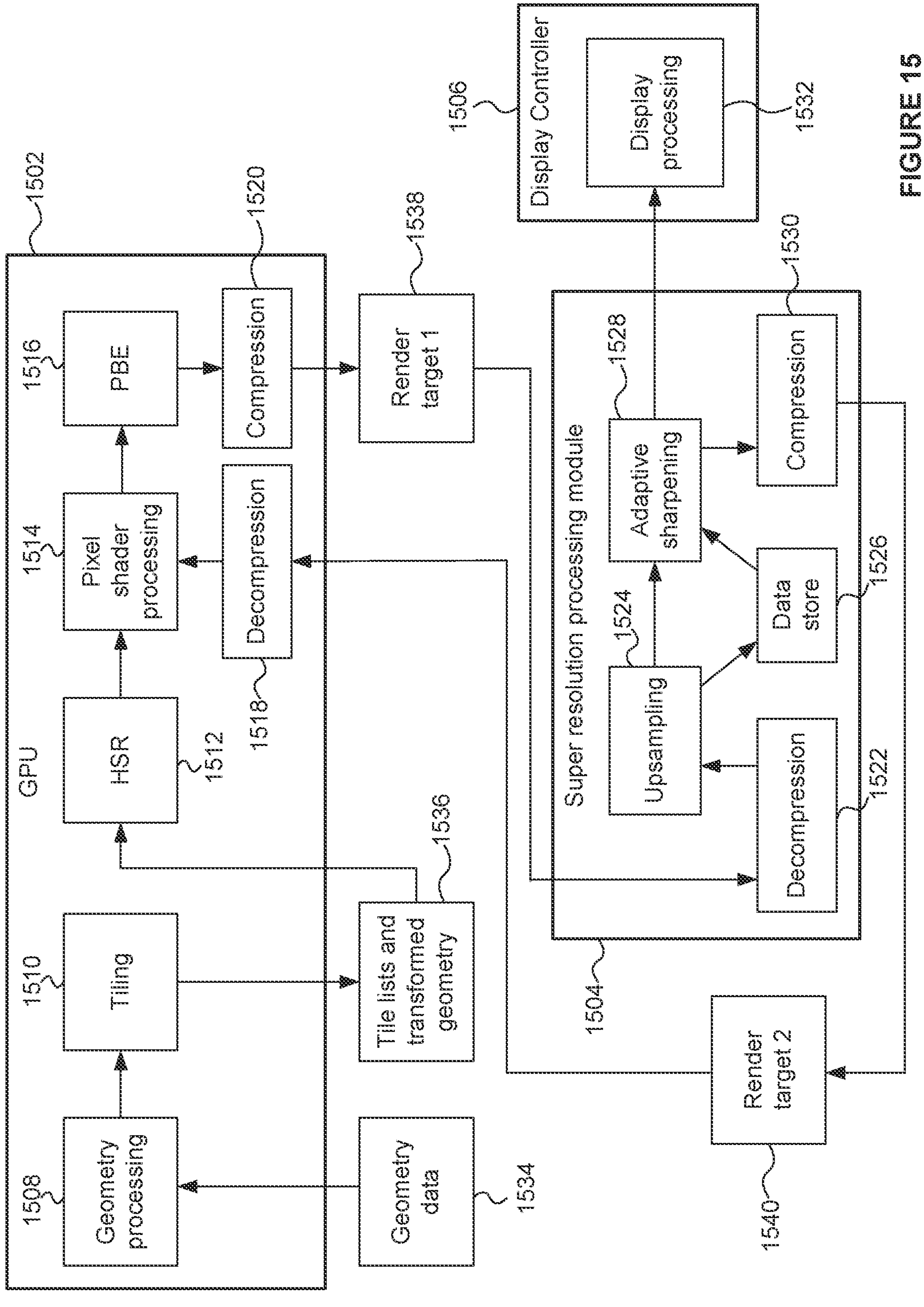
FIG. 15 shows a computer system including a GPU, a super resolution processing module and a display controller.

FIG. 15 shows a computer system including a Graphics Processing Unit (GPU) 1502, a super resolution processing module 1504 and a display controller 1506. In this example the GPU 1502 implements a tile-based deferred rendering (TBDR) technique for rendering images based on geometry data representing objects in a scene to be rendered, but in other examples GPUs may implement different rendering techniques. In particular a GPU could implement a rasterization rendering technique, a ray tracing rendering technique or a hybrid rasterization-ray tracing rendering technique. The GPU 1502 comprises geometry processing logic 1508, tiling logic 1510, hidden surface removal (HSR) logic 1512, pixel shader processing logic 1514, a pixel back end (PBE) 1516, decompression logic 1518 and compression logic 1520. The super resolution processing module 1504 comprises decompression logic 1522, upsampling logic 1524, a data store 1526, adaptive sharpening logic 1528 and compression logic 1530. The super resolution processing module 1504 may be implemented as described above, e.g. as processing module 300, 700, 800 or 1000. The display controller 1506 comprises display processing logic 1532. In other examples, the super resolution processing module 1504 may be incorporated elsewhere, such as within the GPU 1502 or the display controller 1506. In some examples the data store 1526, the compression logic 1530, and/or the decompression logic 1522 are not implemented in the super resolution processing module 1504, and the render target 1540 (discussed below) is not necessarily implemented. Furthermore, in some examples (e.g. examples described above) the upsampling logic 1524 and the adaptive sharpening logic 1528 can be combined into a single module so that upsampling and adaptive sharpening can be applied in a single step.

In operation, geometry data 1534 is received by the geometry processing logic 1508 which can perform geometry processing on the geometry data as known in the art, e.g. to transform the geometry represented by the geometry data from a 3D scene space into a 2D rendering space. The rendering space may be sub-divided into tiles. The tiling logic 1510 determines tile lists which indicate which items of geometry (e.g. primitives) are present within each of the tiles of the rendering space. The tile lists and the transformed geometry 1536 can be stored in a memory. The GPU can then render each tile on a tile-by-tile basis by reading the tile list for a tile to be rendered and fetching the transformed geometry indicated as being present within that tile by its tile list. The fetched geometry is passed to the HSR logic 1512 which performs hidden surface removal, as is known in the art. For each sample position (e.g. pixel position) of the tile being processed the HSR logic 1512 may determine which of the items of geometry (e.g. primitives) is visible at that sample position. Then the pixel shader processing logic 1514 can execute a shader program for determining an appearance of the rendered image at the sample position based on which of the items of geometry is visible at the sample position. The execution of the shader program may involve sampling a texture which indicates an appearance of an item of geometry. Then the PBE 1516 may perform some post-processing, e.g. blending, in order to determine final rendered values for the sample positions of the tile being processed. These rendered values can be compressed by the compression logic 1520 and stored in a render target 1538. A render target is a memory, or a designated area of a memory, for storing the values produced by a render operation (noting that upsampling is a form of render operation). The HSR logic 1512, pixel shader processing logic 1514 and PBE 1516 operate on all of the tiles of the rendering space until the rendered values for the whole image have been determined, compressed and stored in the render target 1538.

If super resolution were not being implemented then the rendered values in the render target 1538 may be passed to the display processing logic 1532 of the display controller 1506 which could decompress the compressed rendered values and perform any processing necessary to determine data to be passed to a display (not shown in FIG. 15) such that the rendered image could be displayed on the display. However, in the example shown in FIG. 15 the super resolution processing module 1504 is implemented, in this case as a separate module in between the GPU 1502 and the display controller 1506, and operates to apply super resolution to the rendered image generated by the GPU 1502 before it is passed to the display controller 1506. That is, pixels may be output from the super resolution module at a higher rate than pixels are input, corresponding to an upsampling factor being applied.

In particular, the compressed rendered image is received at the super resolution processing module 1504, e.g. from the render target 1538, and the decompression logic 1522 decompresses the compressed rendered image to determine an input image for the super resolution technique to be applied to. It is noted that decompression algorithms can be block-based, but in such cases there is no requirement for the blocks utilised in the decompression algorithm to correspond to the blocks of pixels input to the super resolution processing (e.g. a block utilised in the decompression algorithm may cover multiple blocks of pixels to be input to the super resolution processing, wholly or partially). This input image can be processed as described above with reference to FIGS. 3 to 14 to determine an output image which has a higher resolution than the input image. For example, the upsampling logic 1524 and adaptive sharpening logic 1528 (which may be combined) may operate as described in detail above to determine an upsampled image. This upsampled image can be passed to the display processing logic 1532 of the display controller 1506 which can perform any processing necessary to determine data to be passed to a display (not shown in FIG. 15) such that the upsampled rendered image can be displayed on the display.

Passing the upsampled image to the display processing logic 1532 of the display controller 1506 may optionally comprise outputting the upsampled image for storage in a memory. This is not shown in FIG. 15, but such a memory may be between the display controller and the 1506 and the super resolution processing module 1504.

Moreover, rather than outputting the upsampled image for display, it may instead (or additionally) be output for transmission. For example, the upsampled image may be transmitted back to the GPU 1502, which may also involve a step of outputting the upsampled image for storage in a memory. An example of this is shown in FIG. 15 and described below.

Compression logic 1530 of the super resolution processing module 1504 may compress the upsampled image and store the compressed upsampled image in the render target 1540. It is noted that compression algorithms can be block-based, but in such cases there is no requirement for the blocks utilised in the compression algorithm to correspond to the blocks of pixels output by the super resolution processing (e.g. a block utilised in the compression algorithm may cover multiple blocks of pixels output by the super resolution processing, wholly or partially). In some implementations, the compressed upsampled image could be passed back from the render target 1540 to the decompression logic 1518 of the GPU, and the decompression logic 1518 can decompress the compressed upsampled image. The decompressed upsampled image may then be used by the pixel shader processing logic 1514 for performing a subsequent render. For example, a texture could be rendered at a low resolution in a first rendering pass, and then the super resolution module 1504 could be used to upsample the rendered texture to a higher resolution and then this higher resolution texture could be fed back to the GPU for use in applying that texture to geometry in a second rendering pass.

The super resolution processing module could be implemented as a stand-alone block (as shown in FIG. 15) or integrated with other components including but not limited to: (i) a Display Controller and/or Neural Network Engines and/or On Chip Memories and/or GPU and/or 2D Core and/or Digital Signal Processor (DSP) and/or Image Signal Processor (ISP). The Super Resolution and other processing can be implemented using: fixed function, configurable function logic or generic programmable logic (DSP, CPU, NNA, etc.). This may be integrated as dedicated logic in the stand-alone block or may use resources from other processing blocks in the system.

Super Resolution supports dynamic input and output resolution ratios. Typically input resolution will be lower than output target resolution. A common usage may be from 960×540 (quarter HD) to full HD 1920×1080 performing a 2× upscaling in both X and Y direction. Extreme upscaling factors may be supported but this will limit quality/usability, and it is expected that an implementation will have limitations e.g. a max 4× upscaling in both X and Y.

The input data to the super resolution processing module may be different in different implementations. For example, typical GPU input data would be RGB (Red, Green, Blue) or RGBA (Red, Green, Blue, Alpha) data which may be compressed (lossless or lossy) or uncompressed.

The super resolution processing module can be integrated optimally into the computer system to optimise bandwidth and power usage. For example, the scaling up (i.e. upsampling) can be performed as late as possible, i.e. just before the display controller (after the GPU).

The system may allow for an optional write back of a super resolution image to memory (e.g. the in the render target 1540), e.g. with data compression. This would enable: (i) different data flows, e.g. mid-render flow super resolution where the super resolution is used in later render passes by the GPU (as mentioned above), and/or (ii) screenshots or video streaming, e.g. the images may not go to the display but instead to memory for screenshots or to a video encoder.

The super resolution processing may support flexible bit rates including but not limited to common RGBA8888 and RGBA1010102 but may also include HDR formats such as F16F16F16F16 or E5999. The super resolution processing may support different colour formats outside of RGBA e.g. YUV or other. Multiple quality levels of algorithms may be exposed trading quality, bandwidth, throughput, etc.

Processing capabilities may be enabled using a variety of controls at the software level including but not limited to: (i) driver/system enabled automatically, (ii) extensions in applications to standard graphics APIs such as Khronos Vulkan or OpenGL ES, and/or (iii) extensions functionality exposed at the OS level e.g. optimisation settings/features such as Android Game Controls.

Figure 12:
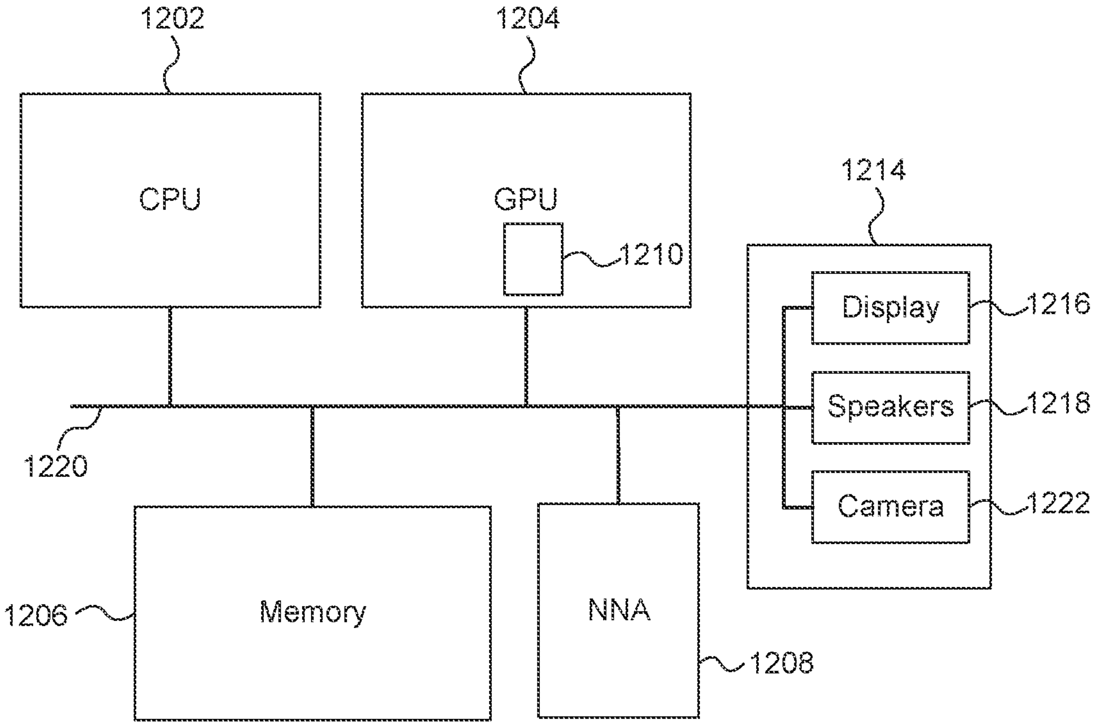
FIG. 12 shows a computer system in which a processing module is implemented.

FIG. 12 shows a computer system in which the processing modules described herein may be implemented. The computer system comprises a CPU 1202, a GPU 1204, a memory 1206, a neural network accelerator (NNA) 1208 and other devices 1214, such as a display 1216, speakers 1218 and a camera 1222. A processing block 1210 (corresponding to processing modules 300, 700, 800 or 1000) is implemented on the GPU 1204. In other examples, one or more of the depicted components may be omitted from the system, and/or the processing block 1210 may be implemented on the CPU 1202 or within the NNA 1208 or in a separate block in the computer system. The components of the computer system can communicate with each other via a communications bus 1220.

The processing modules of FIGS. 3*a*, 7*a*, 8 and 10*a*) are shown as comprising a number of functional blocks. This is schematic only and is not intended to define a strict division between different logic elements of such entities. Each functional block may be provided in any suitable manner. It is to be understood that intermediate values described herein as being formed by a processing module need not be physically generated by the processing module at any point and may merely represent logical values which conveniently describe the processing performed by the processing module between its input and output.

The processing modules described herein may be embodied in hardware on an integrated circuit. The processing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing module configured to perform any of the methods described herein, or to manufacture a processing module comprising any apparatus described herein. An integrated circuit definition dataset may be, for example, an integrated circuit description.

Therefore, there may be provided a method of manufacturing, at an integrated circuit manufacturing system, a processing module as described herein. Furthermore, there may be provided an integrated circuit definition dataset that, when processed in an integrated circuit manufacturing system, causes the method of manufacturing a processing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS™ and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing module will now be described with respect to FIG. 13.

Figure 13:
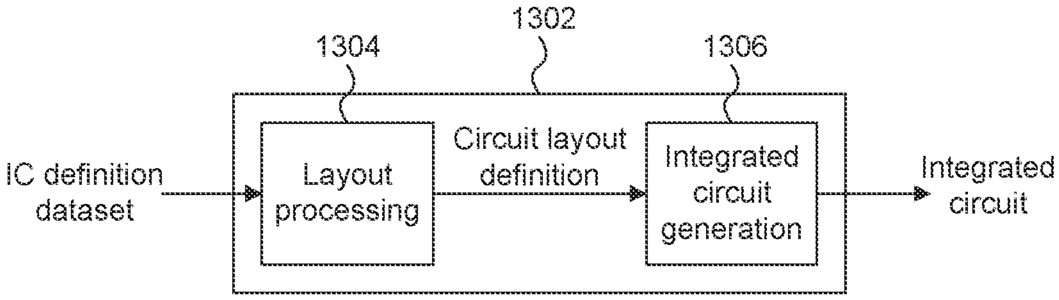
FIG. 13 shows an integrated circuit manufacturing system for generating an integrated circuit embodying a processing module.

FIG. 13 shows an example of an integrated circuit (IC) manufacturing system 1302 which is configured to manufacture a processing module as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a processing module as described in any of the examples herein), process the IC definition dataset, and generate an IC according to the IC definition dataset (e.g. which embodies a processing module as described in any of the examples herein). The processing of the IC definition dataset configures the IC manufacturing system 1302 to manufacture an integrated circuit embodying a processing module as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of upsampling a block of input pixels to determine a block of upsampled pixels, wherein at least one of the upsampled pixels is a diagonal pixel, wherein a diagonal pixel is at a position that is not in any of the rows nor in any of the columns of input pixels in the block of input pixels, the method comprising:

determining indications of image gradients for the block of input pixels;

using the determined indications of image gradients to determine one or more weighting parameters which are indicative of weights of a diagonal kernel, wherein the diagonal kernel is rotationally symmetric with an order of rotational symmetry of two; and determining the upsampled pixels of the block of upsampled pixels by applying kernels to the block of input pixels, wherein the diagonal pixel in the block of upsampled pixels is determined by applying the diagonal kernel to the block of input pixels in accordance with the determined one or more weighting parameters.

2. The method of claim 1, wherein said using the determined indications of image gradients to determine one or more weighting parameters which are indicative of weights of a diagonal kernel comprises:

determining a weighting parameter indicative of a relatively low weight of the diagonal kernel at a position corresponding to a first input pixel on a first diagonal line passing in a first diagonal direction through the diagonal pixel position in response to the determined indications of image gradients indicating that there is a relatively high image gradient in the first diagonal direction; and determining a weighting parameter indicative of a relatively high weight of the diagonal kernel at a position corresponding to a second input pixel on a second diagonal line passing in a second diagonal direction through the diagonal pixel position in response to the determined indications of image gradients indicating that there is a relatively low image gradient in the second diagonal direction.

3. The method of claim 2, wherein the first and second diagonal directions are perpendicular to each other and are both at 45 degrees to a horizontal axis of the block of input pixels.

4. The method of claim 1, wherein in response to the determined indications of image gradients being non-zero the one or more weighting parameters are determined to be indicative of anisotropic weights for the diagonal kernel.

5. The method of claim 1, wherein the weights of the diagonal kernel are normalised such that the sum of the weights in the diagonal kernel is one.

6. The method of claim 1, wherein said determining indications of image gradients for the block of input pixels comprises:

applying a first gradient kernel to a patch of input pixels to determine a first indication of an image gradient in a first direction, wherein the patch of input pixels includes the block of input pixels; and applying a second gradient kernel to the patch of input pixels to determine a second indication of an image gradient in a second direction different to the first direction.

7. The method of claim 6, wherein the patch of input pixels is larger than the block of input pixels.

8. The method of claim 6, wherein the first direction is a horizontal direction and the first indication of an image gradient, dx, indicates a horizontal image gradient in the patch of input pixels, wherein the second direction is a vertical direction and the second indication of an image gradient, dy, indicates a vertical image gradient in the patch of input pixels;

wherein said using the determined indications of image gradients to determine one or more weighting parameters which are indicative of weights of a diagonal kernel comprises:

summing dx and dy to determine a first intermediate value, α;

finding a difference between dx and dy to determine a second intermediate value, β; and using the first and second intermediate values to determine two weighting parameters, a and b, which are used to define the weights of the diagonal kernel.

9. The method of claim 8, wherein the patch of input pixels is a 5×5 patch of input pixels, wherein the first gradient kernel is $$\begin{bmatrix} 0 & 0 & 0 & 0 & 0 \\ -1 & -1 & 0 & 1 & 1 \\ -1 & -1 & 0 & 1 & 1 \\ -1 & -1 & 0 & 1 & 1 \\ 0 & 0 & 0 & 0 & 0 \end{bmatrix}$$

$$\begin{bmatrix} 0 & 0 & 0 & 0 & 0 \\ 1 & 1 & 0 & -1 & -1 \\ 1 & 1 & 0 & -1 & -1 \\ 1 & 1 & 0 & -1 & -1 \\ 0 & 0 & 0 & 0 & 0 \end{bmatrix},$$

and wherein the second gradient kernel is $$\begin{bmatrix} 0 & -1 & -1 & -1 & 0 \\ 0 & -1 & -1 & -1 & 0 \\ 0 & 0 & 0 & 0 & 0 \\ 0 & 1 & 1 & 1 & 0 \\ 0 & 1 & 1 & 1 & 0 \end{bmatrix} \text{ or } \begin{bmatrix} 0 & 1 & 1 & 1 & 0 \\ 0 & 1 & 1 & 1 & 0 \\ 0 & 0 & 0 & 0 & 0 \\ 0 & -1 & -1 & -1 & 0 \\ 0 & -1 & -1 & -1 & 0 \end{bmatrix}.$$

10. The method of claim 8, wherein $$a = \frac{\beta}{(\alpha + \beta)} \text{ and } b = \frac{\alpha}{(\alpha + \beta)}.$$

11. The method of claim 8, wherein $$\alpha = \begin{cases} 1 \text{ where } \beta \geq \alpha \\ 0 \text{ where } \alpha > \beta \end{cases}$$

and $$b = \begin{cases} 0 \text{ where } \beta \geq \alpha \\ 1 \text{ where } \alpha > \beta \end{cases}.$$

12. The method of claim 8, wherein a=f(α−β,m) and b=f(β−α,m), wherein a+b=1, wherein f is a function such that $$f(x, m) = \left[\frac{1}{2} - mx\right]_0^1,$$

where m is a parameter that controls how the diagonal pixel in the block of upsampled pixels is determined.

13. The method of claim 6, wherein the first direction is a first diagonal direction and the first indication of an image gradient corresponds to a first intermediate value, α, and indicates a first diagonal image gradient in the patch of input pixels, wherein the second direction is a second diagonal direction and the second indication of an image gradient corresponds to a second intermediate value, β, and indicates a second diagonal image gradient in the patch of input pixels;

wherein said using the determined indications of image gradients to determine one or more weighting parameters which are indicative of weights of a diagonal kernel comprises using the first and second intermediate values to determine two weighting parameters, a and b, which are used to define the weights of the diagonal kernel.

14. The method of claim 13, wherein the patch of input pixels is a 5×5 patch of input pixels, wherein the first gradient kernel is $$\begin{bmatrix} 0 & -1 & -1 & -1 & 0 \\ -1 & -2 & -1 & 0 & 1 \\ -1 & -1 & 0 & 1 & 1 \\ -1 & 0 & 1 & 2 & 1 \\ 0 & 1 & 1 & 1 & 0 \end{bmatrix}$$

or $$\begin{bmatrix} 0 & 1 & 1 & 1 & 0 \\ 1 & 2 & 1 & 0 & -1 \\ 1 & 1 & 0 & -1 & -1 \\ 1 & 0 & -1 & -2 & -1 \\ 0 & -1 & -1 & -1 & 0 \end{bmatrix},$$

and wherein the second gradient kernel is $$\begin{bmatrix} 0 & 1 & 1 & 1 & 0 \\ -1 & 0 & 1 & 2 & 1 \\ -1 & -1 & 0 & 1 & 1 \\ -1 & -2 & -1 & 0 & 1 \\ 0 & -1 & -1 & -1 & 0 \end{bmatrix}$$

or $$\begin{bmatrix} 0 & -1 & -1 & -1 & 0 \\ 1 & 0 & -1 & -2 & -1 \\ 1 & 1 & 0 & -1 & -1 \\ 1 & 2 & 1 & 0 & -1 \\ 0 & 1 & 1 & 1 & 0 \end{bmatrix}.$$

15. The method of claim 1, wherein said applying the diagonal kernel to the block of input pixels comprises:

applying a first diagonal subkernel to the block of input pixels and multiplying the result by a first of the weighting parameters, a, to determine a first diagonal component;

applying a second diagonal subkernel to the block of input pixels and multiplying the result by a second of the weighting parameters, b, to determine a second diagonal component; and summing the first and second diagonal components to determine the diagonal pixel in the block of upsampled pixels.

16. The method of claim 1, wherein the upsampled pixels in the block of upsampled pixels are non-sharpened upsampled pixel values.

17. The method of claim 1, wherein the upsampled pixels in the block of upsampled pixels are sharpened upsampled pixel values.

18. The method of claim 1, wherein non-diagonal pixels in the block of upsampled pixels are determined by applying respective fixed kernels to the block of input pixels, wherein the fixed kernels do not depend upon the determined image gradients.

19. A processing module, implemented in hardware, configured to upsample a block of input pixels to determine a block of upsampled pixels, wherein at least one of the upsampled pixels is a diagonal pixel, wherein a diagonal pixel is at a position that is not in any of the rows nor in any of the columns of input pixels in the block of input pixels, the processing module, implemented in hardware, comprising:

gradient determining logic configured to determine indications of image gradients for the block of input pixels;

weighting parameter determining logic configured to use the determined indications of image gradients to determine one or more weighting parameters which are indicative of weights of a diagonal kernel, wherein the diagonal kernel is rotationally symmetric with an order of rotational symmetry of two; and pixel determining logic configured to determine the upsampled pixels of the block of upsampled pixels by applying kernels to the block of input pixels, wherein the pixel determining logic comprises diagonal kernel application logic configured to determine the diagonal pixel in the block of upsampled pixels by applying the diagonal kernel to the block of input pixels in accordance with the determined one or more weighting parameters.

20. A non-transitory computer readable storage medium having stored thereon an integrated circuit definition dataset that, when processed in an integrated circuit manufacturing system, configures the integrated circuit manufacturing system to manufacture a processing module which is configured to upsample a block of input pixels to determine a block of upsampled pixels, wherein at least one of the upsampled pixels is a diagonal pixel, wherein a diagonal pixel is at a position that is not in any of the rows nor in any of the columns of input pixels in the block of input pixels, the processing module comprising:

gradient determining logic configured to determine indications of image gradients for the block of input pixels;

weighting parameter determining logic configured to use the determined indications of image gradients to determine one or more weighting parameters which are indicative of weights of a diagonal kernel, wherein the diagonal kernel is rotationally symmetric with an order of rotational symmetry of two; and pixel determining logic configured to determine the upsampled pixels of the block of upsampled pixels by applying kernels to the block of input pixels, wherein the pixel determining logic comprises diagonal kernel application logic configured to determine the diagonal pixel in the block of upsampled pixels by applying the diagonal kernel to the block of input pixels in accordance with the determined one or more weighting parameters.

* * * * *